US009781351B2

(12) United States Patent
Osawa

(10) Patent No.: US 9,781,351 B2
(45) Date of Patent: Oct. 3, 2017

(54) ZOOMING CONTROL DEVICE AND METHOD FOR CONTROLLING ZOOMING CONTROL DEVICE

(71) Applicant: CANON KABUSHIKI KAISHA, Tokyo (JP)

(72) Inventor: Shinnosuke Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/077,777

(22) Filed: Mar. 22, 2016

(65) Prior Publication Data

US 2016/0295125 A1     Oct. 6, 2016

(30) Foreign Application Priority Data

Mar. 30, 2015   (JP) ................................ 2015-070195

(51) Int. Cl.
*H04N 5/232* (2006.01)

(52) U.S. Cl.
CPC ..... *H04N 5/23296* (2013.01); *H04N 5/23219* (2013.01); *H04N 5/23245* (2013.01)

(58) Field of Classification Search
CPC .......... H04N 5/23296; H04N 5/23219; H04N 5/23245
USPC .......... 348/240.99, 240.1, 240.2, 240.3, 347, 348/208.6, 211.9, 333, 333.01, 333.02, 348/333.11, 222.1; 382/117, 118; 396/85, 379
See application file for complete search history.

(56) References Cited

U.S. PATENT DOCUMENTS

| | | | | |
|---|---|---|---|---|
| 7,432,973 B2 * | 10/2008 | Iga | ........................ | H04N 5/232 348/239 |
| 2007/0274703 A1 * | 11/2007 | Matsuda | ................ | G03B 13/12 396/264 |
| 2008/0199056 A1 * | 8/2008 | Tokuse | ............... | G06K 9/00295 382/118 |
| 2008/0239104 A1 * | 10/2008 | Koh | ................... | G06K 9/00221 348/240.99 |
| 2010/0226635 A1 * | 9/2010 | Hirano | ................... | G02B 7/102 396/87 |

(Continued)

FOREIGN PATENT DOCUMENTS

JP       2012-095019 A      5/2012

*Primary Examiner* — Lin Ye
*Assistant Examiner* — Marly Camargo
(74) *Attorney, Agent, or Firm* — Canon USA Inc., IP Division

(57) ABSTRACT

A zooming control device includes a first determination unit configured to determine whether a current state is a specific image capturing state in which a photographer can perform self photographing, a zooming control unit configured to, in a case in which it is determined that an image does not satisfy a predetermined composition condition, perform zooming control so as to satisfy the predetermined composition condition, and a reception unit configured to receive a predetermined operation for instructing an image capturing preparation operation. The zooming control unit performs the zooming control in a first state in which the predetermined operation is not received, and in a case in which the first determination unit determines that the current state is the specific image capturing state, the zooming control unit continues the zooming control even in a second state in which the predetermined operation is received.

13 Claims, 19 Drawing Sheets

(56) References Cited

U.S. PATENT DOCUMENTS

2011/0007191 A1\* 1/2011 Song ..................... H04N 5/232
 348/240.99
2012/0098992 A1\* 4/2012 Hosoe ................ G06K 9/00255
 348/222.1

\* cited by examiner

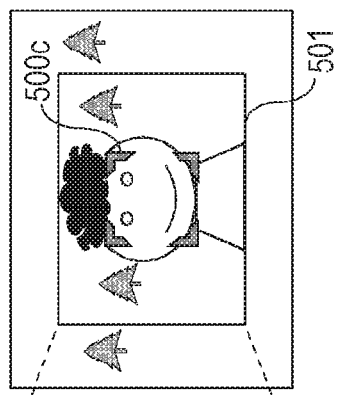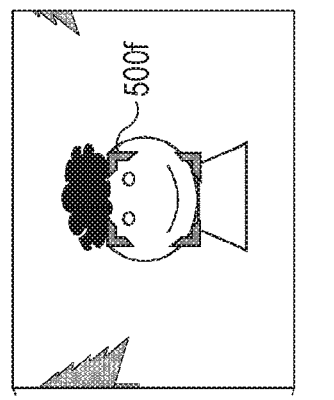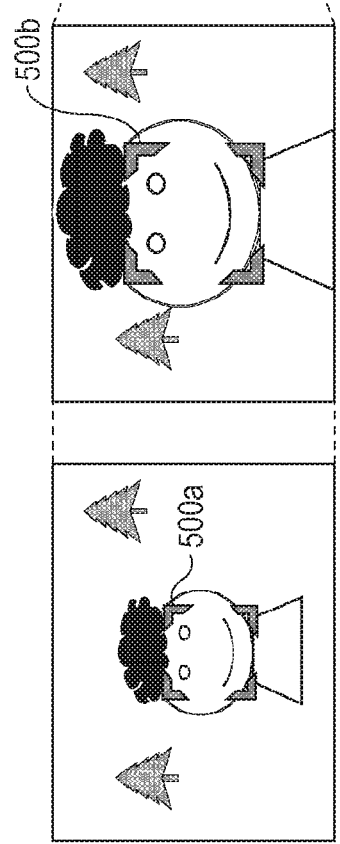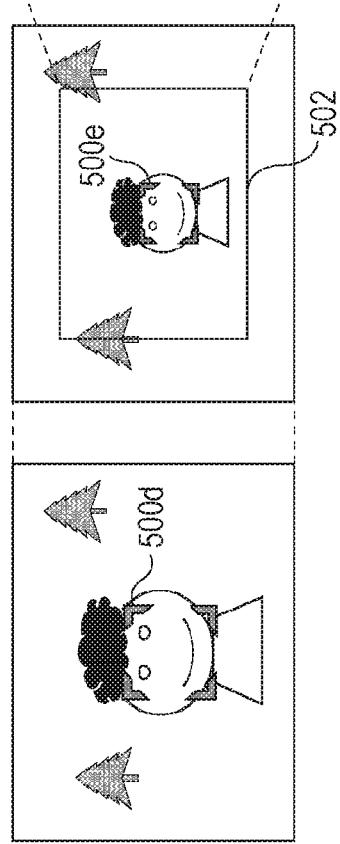
FIG. 5A FIG. 5B FIG. 5C FIG. 5D FIG. 5E FIG. 5F FIG. 10
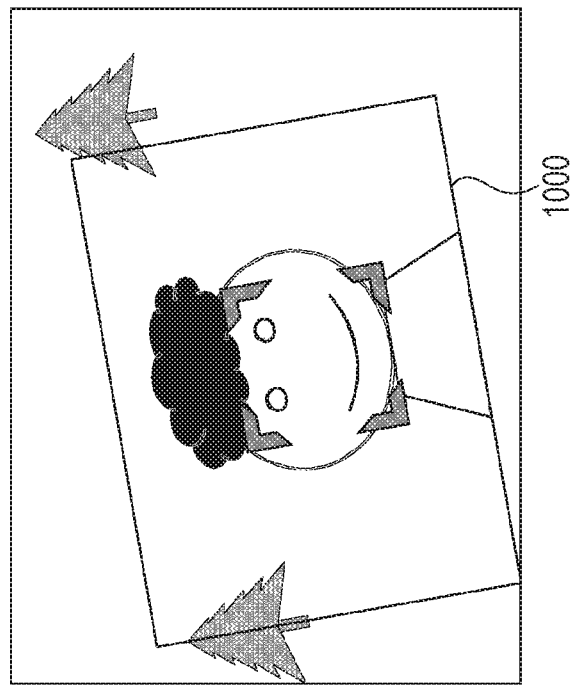
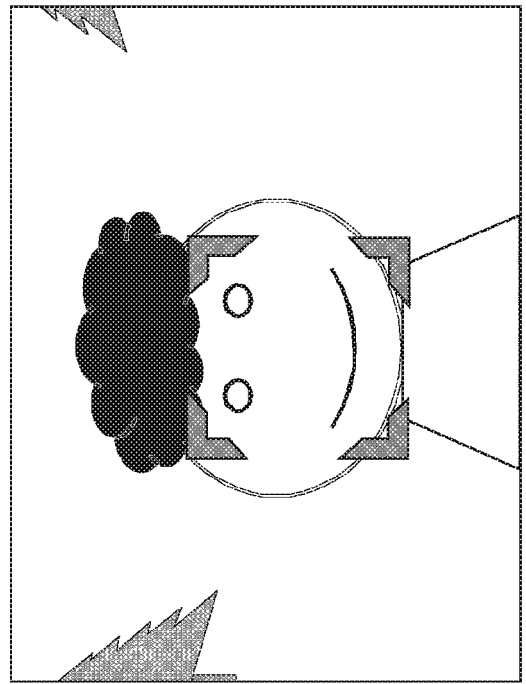

FIG. 17

| COMPOSITION | NUMBER OF FACES FOR ESTIMATING SUBJECT POSITION | | |
|---|---|---|---|
| | SHOULDER (Ns) | HEAD (Nh) | BODY (Nb) |
| FACE | 1 | 1.5 | 1.5 |
| UPPER BODY | 2 | 1.5 | 5 |
| ENTIRE BODY | 2 | 1.5 | 10 |
| PLURALITY OF SUBJECTS | 2 | 1.5 | 3.5 |

ZOOMING CONTROL DEVICE AND METHOD FOR CONTROLLING ZOOMING CONTROL DEVICE

BACKGROUND OF THE INVENTION

Field of the Invention

The present invention relates to a technique for controlling a zoom magnification by detecting a subject image from an image.

Description of the Related Art

There has been conventionally known an imaging apparatus having a function of enabling a photographer to easily take a photo of himself or herself (so-called self photographing), by performing image capturing with a monitor oriented toward a barrel lens direction using a tilt movable liquid crystal monitor or the like. In addition, there is an imaging apparatus having a function of performing optical zooming by driving a zoom lens and a function of performing electronic zooming by magnifying a part of a captured image. Furthermore, there is known an imaging apparatus having an automatic zooming function of automatically changing a zoom magnification according to the detection information of a subject.

Japanese Patent Application Laid-Open No. 2012-95019 discloses the configuration of a camera equipped with an automatic zooming function of keeping the size of a subject constant. In the automatic zooming function disclosed in Japanese Patent Application Laid-Open No. 2012-95019, a photographer selects a reference composition from among a plurality of options such as "face closeup", "upper body closeup", and "entire body", and automatic zooming control is performed so as to keep the size substantially matching a reference subject size predefined for each reference composition. The photographer performs an operation of issuing an image capturing instruction at a timing at which a field angle matching the set reference composition is achieved, so that a captured image with a desired composition can be obtained.

Nevertheless, in self photographing, the above-described image capturing method may fail to obtain a captured image with a composition desired by the photographer in some cases. FIGS. 8A and 8B are diagrams illustrating the states of self photographing. As illustrated in FIG. 8A, a photographer checks, using a display unit 109, whether a desired composition is achieved through automatic zooming control, and shifts to image capturing preparation at a timing at which it can be checked that the desired composition is achieved. At this time, if the photographer desires to capture an image in which the photographer looks toward a camera direction, the photographer needs to start an image capturing operation after turning his or her eyes toward the direction of a digital camera 100 (the direction of an imaging optical system) as illustrated in FIG. 8B, from the state in which the photographer looks at the display unit 109 for checking the composition.

Nevertheless, during a period from the image capturing preparation to the image capturing, the composition may shift due to hand shake or the like. Furthermore, if the photographer looks away from the monitor for capturing an image in which the photographer looks toward the camera direction, image capturing may be performed without the photographer realizing that the composition has shifted. As a result, although the photographer has checked at the time of image capturing preparation that the desired composition has been achieved, a captured image with a desired composition may fail to be obtained. For example, a subject may go out of a frame, or a subject size within a screen may change to be larger.

SUMMARY OF THE INVENTION

In view of the above-described problem, the present invention aims to realize automatic zooming control for obtaining a captured image with an appropriate composition in a specific image capturing state such as self photographing.

To achieve the above object, a zooming control device according to an aspect of the present invention includes a first determination unit configured to determine whether a current state is a specific image capturing state in which a photographer can perform image capturing while viewing an image of a subject including the photographer itself, an acquisition unit configured to acquire information relating to a subject detected from an image, a second determination unit configured to determine whether an image satisfies a predetermined composition condition, based on the information relating to the subject that has been acquired by the acquisition unit, a zooming control unit configured to, in a case in which the second determination unit determines that the image does not satisfy the predetermined composition condition, perform zooming control so as to satisfy the predetermined composition condition, and a reception unit configured to receive a predetermined operation for instructing an image capturing preparation operation. The zooming control unit performs the zooming control in a first state in which the predetermined operation is not received by the reception unit, and in a case in which the first determination unit determines that the current state is the specific image capturing state, the zooming control unit continues the zooming control even in a second state in which the predetermined operation is received.

Further features of the present invention will become apparent from the following description of exemplary embodiments (with reference to the attached drawings).

BRIEF DESCRIPTION OF THE DRAWINGS

FIGS. 5A to 5F are diagrams illustrating processing for preventing a subject (human figure) from changing in size within a screen.

FIG. 10 is a diagram illustrating automatic zooming control that is performed based on a size, a position, and an incline of a subject.

FIG. 17 illustrates a table listing the numbers of faces for estimating a subject position.

DESCRIPTION OF THE EMBODIMENTS

An exemplary embodiment of the present invention will be described in detail below based on the attached drawings.
<Apparatus Configuration>

Figure 1:
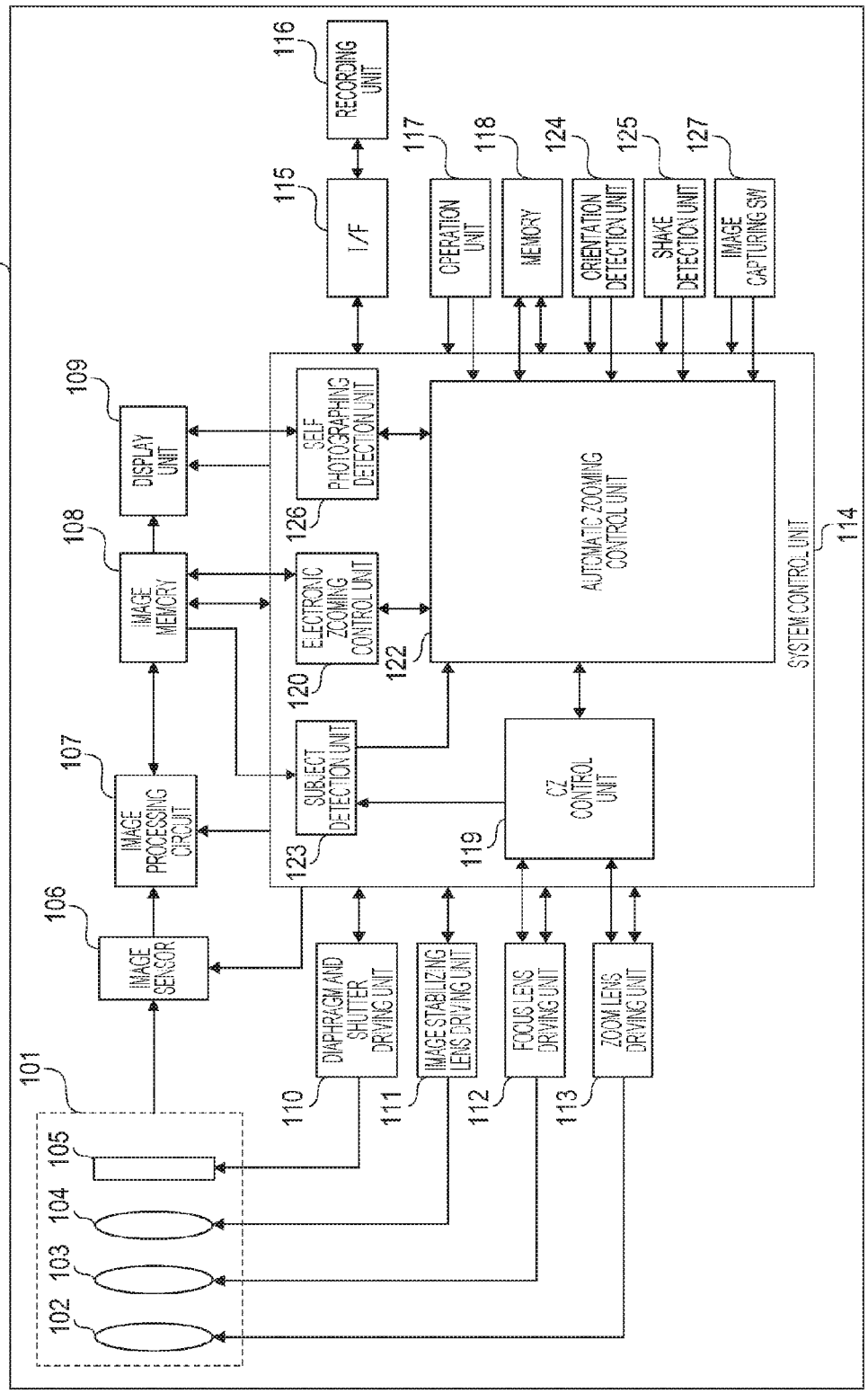
FIG. 1 is a block diagram illustrating a configuration example of a digital camera according to an exemplary embodiment of the present invention.
Figure 3:
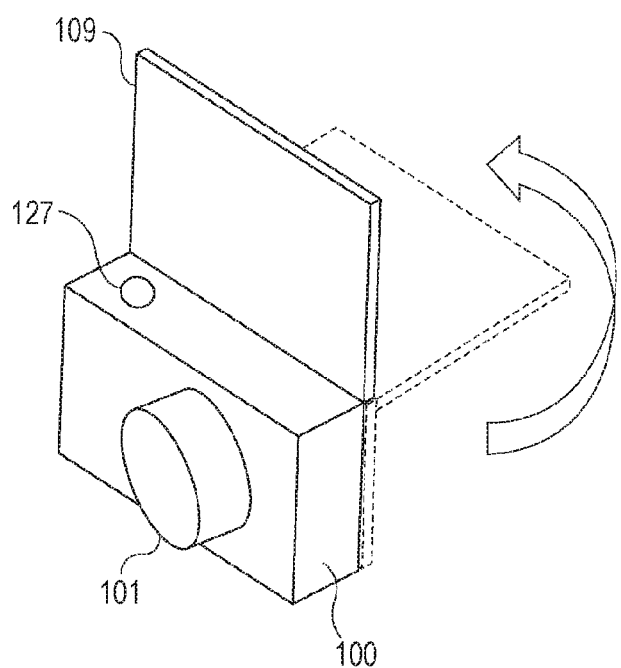
FIG. 3 is a diagram illustrating an example of a digital camera having a tilt movable display unit.

FIG. 1 is a block diagram illustrating a configuration example of a digital camera 100 as an example of an imaging apparatus including a zooming control device according to the present exemplary embodiment. FIG. 3 is an external view of the digital camera 100 according to the present exemplary embodiment. The digital camera 100 is configured to execute an automatic zooming function.

A lens barrel 101 holds a lens group thereinside. A zoom lens 102 moves in an optical axis direction of the lens barrel 101 to adjust a focal length and optically change a field angle (move a zoom position). A focus lens 103 moves in the optical axis direction of the lens barrel 101 to perform focus adjustment. An image stabilizing lens 104 is a correction lens for correcting image blurring caused by hand shake. A diaphragm and a shutter 105 for performing light amount adjustment are used for exposure control. In the present exemplary embodiment, the digital camera 100 is an imaging apparatus in which the lens barrel 101 and a camera main body are integrally formed. The digital camera 100, however, is not limited to such an imaging apparatus. The present exemplary embodiment is applicable to an imaging system including a camera main body and an interchangeable lens detachably attached to the camera main body.

An image sensor 106 receives light that has passed through the lens barrel 101, and converts a subject image into an electrical signal through photoelectric conversion, thereby generating an image capturing signal. The image sensor 106 includes a charge-coupled device (CCD) or complementary metal-oxide semiconductor (CMOS) image sensor. The image capturing signal is input to an image processing circuit 107, and subjected to various types of processing such as pixel interpolation processing and color conversion processing. The image data having been subjected to the various types of processing is stored into an image memory 108. The image memory 108 is a storage unit including a dynamic random access memory (DRAM), a static random access memory (SRAM), and the like.

A display unit 109 includes a thin-film transistor liquid crystal display (TFT-LCD) and the like, and displays a captured image (image data) and specific information (e.g., image capturing information, etc.). The information display of a live view related to a captured image and the like realizes an electronic viewfinder (EVF) function for a photographer adjusting a field angle. In addition, as illustrated in FIG. 3, the display unit 109 has a tilt movable structure, and can be moved in an upper direction by approximately 180 degrees. When self photographing, by moving the display unit 109 in the upper direction so that the display unit 109 is oriented toward the direction of the lens barrel 101, the photographer can capture an image of himself or herself while viewing a captured image displayed on the display unit 109 to adjust a field angle. In addition, the configuration is not limited to the configuration illustrated in FIG. 3 as long as the photographer can view a captured image displayed on the display unit 109. The display unit 109 may be configured to be movable in a lower direction, or may have a variable angle type structure. In addition, a second display unit may be provided on the front surface of the digital camera 100 (the surface on which the lens barrel 101 is provided), and an image may be displayed thereon in self photographing.

A diaphragm and shutter driving unit 110 calculates exposure control values (aperture value and shutter speed) based on luminance information obtained through the image processing performed by the image processing circuit 107, and drives the diaphragm and the shutter 105 based on the calculation result. Automatic exposure (AE) control is thereby performed. An image stabilizing lens driving unit 111 calculates the amount of shake applied to the digital camera 100, based on shake detection information obtained by an angular velocity sensor such as a gyro sensor. According to the calculation result, the image stabilizing lens 104 is driven so that the amount of shake applied to the digital camera 100 is canceled (reduced).

A focus lens driving unit 112 drives the focus lens 103. In the present exemplary embodiment, the digital camera 100 performs automatic focusing control (AF control) using a contrast detection method. In other words, the focus lens driving unit 112 drives the focus lens 103 so that a subject is in focus, based on focus adjustment information (contrast evaluation value) of an imaging optical system that has been obtained through the image processing performed by the image processing circuit 107. The method, however, is not limited to the contrast detection method. The digital camera 100 may be configured to perform AF control using a phase-different AF method as AF control using a method other than the contrast detection method. Alternatively, the digital camera 100 may be configured to perform AF control using a plurality of methods such as the combination of the contrast detection method and another method.

A zoom lens driving unit 113 drives the zoom lens 102 according to a zooming operation instruction. An operation unit 117 includes a zoom lever, a zoom button, or the like that serves as a zooming operation member for the photographer instructing the camera to perform zooming. A system control unit 114 calculates a zoom driving speed and a zoom driving direction by detecting an operation amount and an operation direction of a zooming operation member used for a zooming instruction operation, and controls the zoom lens 102 to move along an optical axis according to the calculation result.

The image data generated by an image capturing operation is transmitted to a recording unit 116 via an interface unit (I/F unit) 115 to be recorded. The image data is recorded on an external recording medium such as a memory card that is attached to the digital camera 100 to be used, or on a nonvolatile memory 118 built in the digital camera 100.

Alternatively, the image data is recorded on both of the external recording medium and the memory 118. Aside from program data and image data, the memory 118 stores setting information of the digital camera 100 and information relating to a zoom-in magnification or the like in an automatic zooming function to be described later.

In addition to the above-described zooming operation member, the operation unit 117 includes a release switch for instructing an image capturing start, an automatic zooming operation switch for instructing the start and the end of the automatic zooming function, and the like. A signal from the operation unit 117 is transmitted to the system control unit 114.

The system control unit 114 includes an arithmetic device such as a central processing unit (CPU), and controls the entire digital camera 100 by transmitting a control command to each unit according to an operation performed by the photographer. The system control unit 114 executes various control programs stored in the memory 118. For example, the system control unit 114 executes programs for performing the control of the image sensor 106, AE/AF control, zooming control (including automatic zooming processing), and the like.

Figure 2:
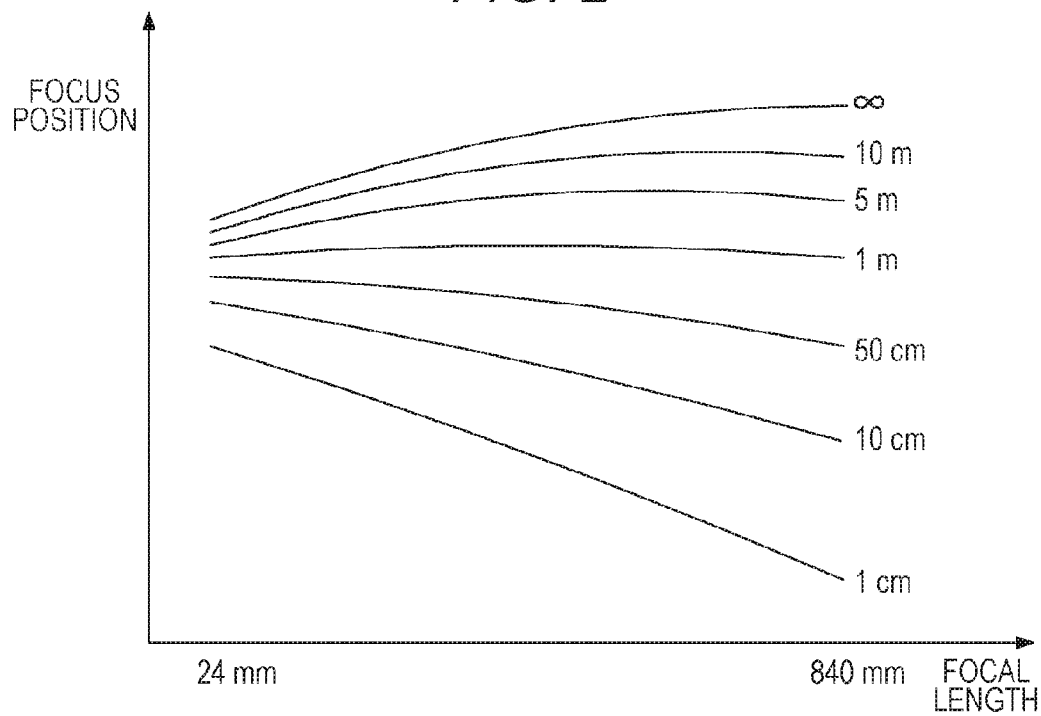
FIG. 2 is a diagram illustrating an example of a relationship between a focal length and a focus lens position of each subject distance.

For maintaining an in-focus state when a field angle is changed by optical zooming, when the lens barrel 101 is of a rear-focusing type, the focus lens 103 needs to be moved to an appropriate focus position according to the position of the zoom lens 102. Such control is referred to as computer zooming (CZ) control. FIG. 2 is a diagram illustrating an example of a relationship between a focal length of the zoom lens and a focus position of each subject distance. FIG. 2 illustrates a graph as a data table indicating a relationship between a focal length of the zoom lens and a focus position at which the camera comes into focus, for each distance to a subject. In the present exemplary embodiment, this table is referred to as a focus cam table. In FIG. 2, a horizontal axis indicates a focal length corresponding to a zoom position, and a vertical axis indicates a focus position. A distance from the digital camera 100 to the subject (subject distance) is indicated beside each graph line.

The system control unit 114 performs a scanning operation by controlling the focus lens driving unit 112 to move the focus lens 103 within a predetermined range during the AF operation. A focus lens position that is an in-focus point is detected according to a known method using a contrast evaluation value and the like that are obtained during the scanning operation. A subject distance can be measured by referring to the focus cam table using the zoom position and the focus position that are obtained at the time.

Next, the control in the system control unit 114 that is related to the automatic zooming function will be described. As illustrated in FIG. 1, the system control unit 114 includes a CZ control unit 119, an electronic zooming control unit 120, an automatic zooming control unit 122, a subject detection unit 123, and a self photographing detection unit 126.

The digital camera 100 according to the present exemplary embodiment has an optical zooming function and an electronic zooming function. The CZ control unit 119 and the zoom lens driving unit 113 perform optical zooming. During the zooming operation, the CZ control unit 119 detects a zoom position of the zoom lens 102 at every predetermined control cycle. The CZ control unit 119 then performs control to drive the focus lens 103 so as to follow the focus cam table in the subject distance measured by performing the AF control according to the detected zoom position. With this configuration, an optical zooming operation can be performed while maintaining the in-focus state.

On the other hand, the electronic zooming control unit 120 and the image memory 108 perform electronic zooming. The electronic zooming control unit 120 realizes the electronic zooming function by extracting data within a target area from image data transferred to the image memory 108. In addition, the electronic zooming control unit 120 realizes smooth electronic zooming display by displaying the extracted area on the display unit 109 while gradually increasing the extracted area at a frame rate cycle of an image taken into the image sensor 106. In the present exemplary embodiment, the description is given assuming that the zooming operation uses both the movement of the zoom lens that is performed in the optical zooming and the extraction of image data that is performed in the electronic zooming. Nevertheless, the zooming operation may use either one of them.

The subject detection unit 123 detects a desired subject area from image data stored in the image memory 108. The detection method of the subject area will be described later. In addition, the subject detection unit 123 can estimate the size of the subject area in the image data by using information relating to a subject distance measured by the CZ control unit 119 and focal length information of the zoom lens 102 together with subject information.

An orientation detection unit 124 detects an orientation (normal position/grip up/grip down) of the digital camera 100 based on information relating to an acceleration sensor. A shake detection unit 125 detects a shake state of the digital camera 100 based on angular velocity information obtained by the gyro sensor, and the like. The shake detection unit 125 determines that the camera is in a hand-held state, when the amount of shake applied to the gyro sensor or the like is equal to or larger than a predetermined amount, and determines that the camera is in a state of being fixed by a tripod stand or the like, when the amount of shake is less than the predetermined amount. The acceleration sensor and the gyro sensor used for the orientation detection and the shake detection may share a common sensor with a sensor of a detection unit for acquiring control information of the image stabilizing lens driving unit 111.

The self photographing detection unit 126 receives, from the display unit 109, a signal indicating that the display unit 109 is oriented toward the direction of the lens barrel 101 (moved to a predetermined position), to detect self photographing. Alternatively, the self photographing detection unit 126 may be configured to detect self photographing, by a user selecting an image capturing mode of self photographing (self photographing mode), via an image capturing mode selection unit (not illustrated). The self photographing detection unit 126 transmits the self photographing detection result to the automatic zooming control unit 122.

An image capturing SW 127 is a physical switch that can be pressed down in two levels. When the image capturing SW 127 is pressed by a half amount, i.e., so-called half-pressed, the system control unit 114 is instructed to perform a preparation operation for image capturing such as the above-described AE/AF control. When the half-pressed state is held after the image capturing preparation instruction is issued, the determined AE/AF control result is continuously maintained. If the image capturing SW 127 is released from the half-pressed state, the camera returns to a previous state in which the AE/AF control is not performed. When the image capturing SW 127 is fully pressed down (full press), image capturing is performed based on the image capturing preparation performed in the half-pressed state.

<Detection Method of Subject Area>

Next, the detection method of a subject area will be described. In the present exemplary embodiment, a subject detection processing (face detection processing) method for detecting a subject (face) from image data will be described.

The face detection processing is processing of detecting a face area existing in image data, using a known algorithm. For example, the subject detection unit 123 extracts a feature amount from a square partial area in the image data, and compares the feature amount with a feature amount of a face that has been prepared in advance. Then, when the correlation therebetween exceeds a predetermined threshold value, the subject detection unit 123 determines the partial area to be a face area. By repeating the determination while changing the combination of the size, arrangement position, and arrangement angle of the partial area, various face areas existing in the image data can be detected.

<Overview of Automatic Zooming Function>

Next, the overview of the automatic zooming function and the automatic zooming control unit 122 will be described. The digital camera 100 according to the present exemplary embodiment has the automatic zooming function. In a camera not equipped with the automatic zooming function, when a subject moves out of a frame while a photographer performs framing in a telephoto state and is waiting for a shutter release opportunity, for example, the following operation needs to be performed.

First, the photographer searches for a subject after zooming out by operating a zooming operation member. After searching for a subject, the photographer adjusts a field angle by performing a zooming operation until a desired field angle is achieved again. In addition, also when the subject moves to change the size of a subject image, for example, the photographer needs to adjust the size of the subject by operating the zooming operation member.

On the other hand, in a camera equipped with the automatic zooming function, the photographer is only required to designate a subject to be image-captured, by performing an operation of designating the subject using a touch panel or the like after setting the automatic zooming function. When the automatic zooming function is set, a zooming operation is automatically performed so as to fit the designated subject within a predetermined size near the center of the image. In addition, as a designation method of a subject, aside from the touch panel operation, there are a method of designating a subject located near the screen center when the photographer presses down a specific button, a method of automatically selecting a main subject from among subjects detected by a camera, and the like.

The subject detection unit 123 calculates the position and the size in image data of a subject area designated from the image memory 108. By consecutively performing the processing on sampling image data every time an image is displayed as a live view, the movement of a subject can be tracked. When the subject being tracked is detected in a zoom-out area to be described later, or when the detected subject becomes larger than a predetermined size, the automatic zooming control unit 122 starts a zoom-out operation. More specifically, the automatic zooming control unit 122 instructs the CZ control unit 119 or the electronic zooming control unit 120 to zoom out toward a wide-angle direction. When the subject is detected within a zoom-in area, and the subject image is fitted within a range of the predetermined size, a zoom-in operation toward a telephoto direction is performed. Owing to such processing, the photographer is only required to move the camera so as to fit a desired subject within a screen, without regard to a zooming operation. Even when the subject is on the verge of going out of a frame, a zoom magnification is automatically changed. Thus, a field angle can be adjusted more easily.

Figure 4A:
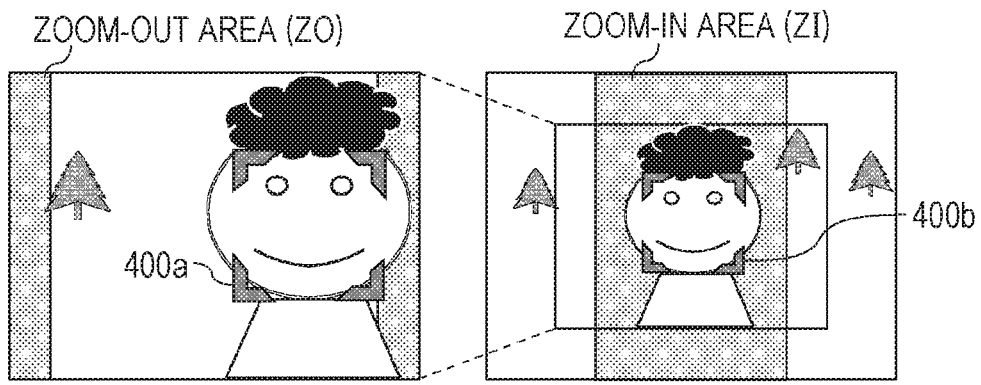
FIGS. 4A to 4C are diagrams illustrating processing for preventing a subject (human figure) from going out of a screen.
Figure 4B:
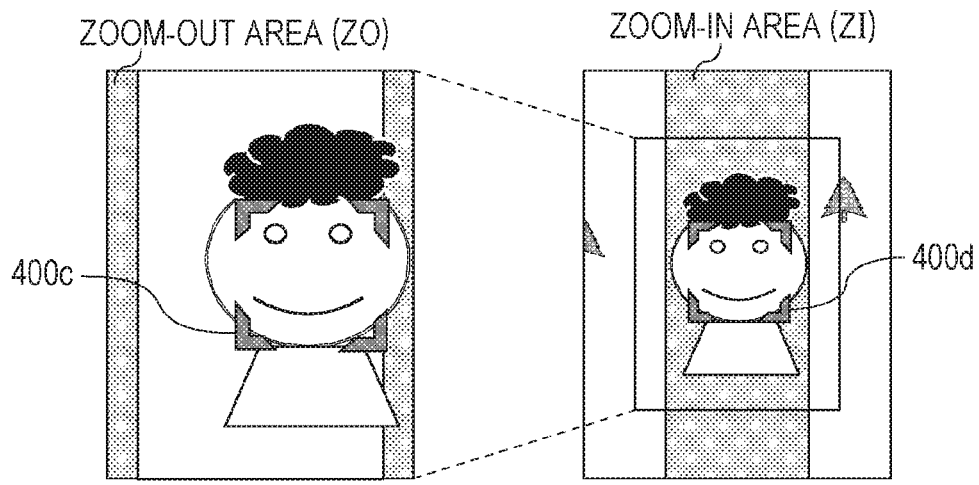
Figure 4C:
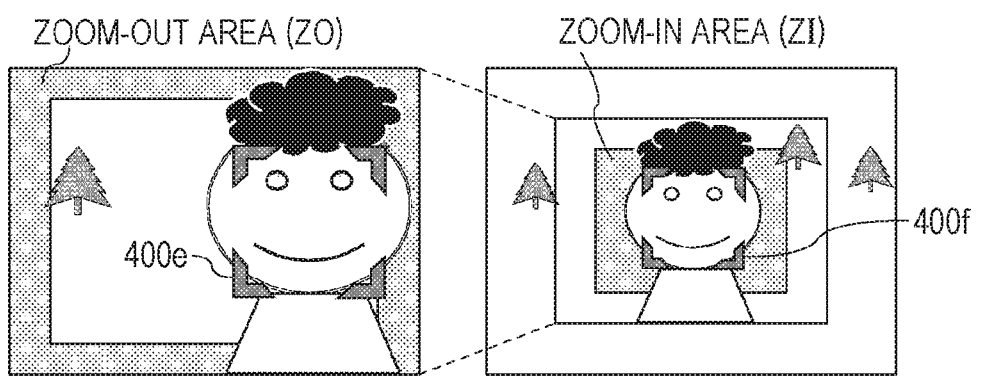

Next, a start condition of the zoom-out operation and the zoom-in operation will be described with reference to FIGS. 4A to 5F. FIGS. 4A to 4C are diagrams illustrating processing for preventing a subject (human figure) from going out of the screen. FIGS. 5A to 5F are diagrams illustrating processing for keeping the size of the subject (human figure) within the screen.

In FIGS. 4A to 4C, frames 400a to 400f are face tracking frames for tracking the subject (face of the human figure). In the present exemplary embodiment, the face tracking frame may be sometimes referred to as a subject tracking frame. For making the subject designated by the photographer identifiable, the subject tracking frame is displayed on an electronic viewfinder (EVF) screen of the display unit 109 in such a manner as to surround the subject. The position and the size on the screen of the subject tracking frame are calculated by the subject detection unit 123 based on face information (and color information), and updated at every frame rate cycle.

In the left diagram in FIG. 4A, an area on the outer side of an area constituting a predetermined ratio with respect to the entire field angle (entire screen) displayed on the EVF is indicated as a zoom-out area ZO. For example, assume that the center point of the screen is set as 0%, the entire screen is set as 100%, and a position defining 80% with respect to the entire screen is set as a boundary of the zoom-out area ZO. In this case, an area corresponding to 80 to 100% in the entire screen is set as the zoom-out area ZO. When a part of the face tracking frame 400a enters the zoom-out area ZO within the image, the automatic zooming control unit 122 performs control to start a zoom-out operation. In addition, the automatic zooming control unit 122 stores a zoom magnification set before the change (equivalent to a zoom-in field angle) into the memory 118. A target zoom magnification and a zooming speed during the zoom-out operation are preset according to the size and the moving speed of the subject. In addition, the target zoom magnification and the zooming speed may be appropriately calculated according to the size and the moving speed of the subject. The zoom-out operation is executed according to the target zoom magnification and the zooming speed. This can efficiently prevent the subject from going out of a frame.

The right diagram in FIG. 4A illustrates a field angle obtained when a zoom-out operation corresponding to a predetermined zoom change amount has been performed from the field angle illustrated in the left diagram in FIG. 4A. In the right diagram in FIG. 4A, an area on the inner side of an area constituting a predetermined ratio with respect to the entire field angle (entire screen) displayed on the EVF in a subject searching state is indicated as a zoom-in area ZI. For example, assume that the center point of the screen is set as 0%, the zoom-in field angle is set as 100%, and a position defining 70% with respect to the zoom-in field angle is set as a boundary of the zoom-in area ZI. In this case, an area corresponding to 0 to 70% in the entire zoom-in field angle is set as the zoom-in area ZI. When the photographer changes the orientation of the camera so as to fit the face tracking frame 400b within the zoom-in area ZI, the automatic zooming control unit 122 performs control to start a zoom-in operation.

Here, the settings of the zoom-out area ZO and the zoom-in area ZI may be arbitrarily changed according to the state and the property of the subject. For example, when an image is captured with the camera being held by a hand, the subject is highly likely to go out of a frame due to the influence of hand shake or the like. In addition, if the zoom-out area ZO is set on the upper part of the screen, the face tracking frame may enter the zoom-out area ZO also when an image is captured with the human figure being arranged near the center, and a zoom-out operation may be unintentionally performed. Nevertheless, when the subject goes out of the frame due to hand shake, the photographer can move the subject into the frame again by performing an operation of moving the subject into the frame. In addition, since the subject is a human figure, it can be predicted that a direction in which the subject moves is often a horizontal direction. Thus, when the subject is a human figure, and the camera is in a hand-held state, it may be defined that the zoom-out area ZO is not set on the upper part of the screen, in consideration of a framing operation of the photographer.

In this manner, in the present exemplary embodiment, when a face is detected by the subject detection unit 123, the areas of the zoom-out area ZO and the zoom-in area ZI are changed according to the orientation of the camera that has been detected by the orientation detection unit 124 and a detection result obtained by the shake detection unit 125. The detection result obtained by the shake detection unit 125 here refers to the detection as to whether the camera is in a hand-held state.

FIG. 4A illustrates the zoom-out area ZO and the zoom-in area ZI that are set when the photographer holds the camera in a normal position with his or her hand. In such an image capturing scene, when the subject moves in a horizontal direction to go out of the frame, the position of the subject in the screen moves in a direction horizontal to the screen in the normal position (longitudinal direction). Thus, as illustrated in FIG. 4A, the vertical belt-like zoom-out area ZO and the zoom-in area ZI are arranged in a direction vertical to the screen in the normal position (shorter side direction). In this case, when the face tracking frame 400a enters the zoom-out area ZO, the automatic zooming control unit 122 determines to start a zoom-out operation, and performs zoom-out operation control corresponding to a predetermined zoom magnification. In addition, when the face tracking frame 400b is fully contained in the zoom-in area ZI, the automatic zooming control unit 122 determines to start a zoom-in operation, and performs a zoom-in operation corresponding to a predetermined zoom magnification until a zoom return field angle is achieved. By setting the zoom-out area ZO and the zoom-in area ZI in this manner, the subject can be efficiently prevented from going out of the frame.

FIG. 4B illustrates the zoom-out area ZO and the zoom-in area ZI that are set when the photographer holds the camera in a vertical position state in which a grip is down or up, in a similar image capturing scene. In this case, the vertical belt-like zoom-out area ZO and the zoom-in area ZI are arranged in a direction vertical to the screen in the vertical position (longitudinal direction). In this case, when the face tracking frame 400c enters the zoom-out area ZO, the automatic zooming control unit 122 determines to start a zoom-out operation, and performs a zoom-out operation corresponding to a predetermined zoom magnification. In addition, when the face tracking frame 400d is fully contained in the zoom-in area ZI, the automatic zooming control unit 122 determines to start a zoom-in operation, and performs zoom-in operation control corresponding to a predetermined zoom magnification until a zoom return field angle is achieved. By setting the zoom-out area ZO and the zoom-in area ZI in this manner, the movement of the subject in the horizontal direction can be detected, and the subject can be efficiently prevented from going out of the frame.

FIG. 4C illustrates the zoom-out area ZO and the zoom-in area ZI that are set when the detection state of the shake detection unit 125 is a fixed state. The fixed state refers to a state in which the camera is fixed by a tripod stand or the like, and there is no concern that the subject goes out of a frame due to hand shake. Furthermore, if a zoom-in operation is performed when the subject is not located within a frame near the center of the screen, the subject may go out of the frame due to the zoom-in operation. Thus, the zoom-out area ZO is set over the entire peripheral portion of the screen, and the zoom-in area ZI is set on the inner side of the zoom-in field angle. In this case, when the face tracking frame 400e enters the zoom-out area ZO, the automatic zooming control unit 122 determines to start a zoom-out operation, and performs zoom-out operation control corresponding to a predetermined zoom magnification. In addition, when the face tracking frame 400f is fully contained in the zoom-in area ZI, the automatic zooming control unit 122 determines to start a zoom-in operation, and performs a zoom-in operation corresponding to a predetermined zoom magnification until a zoom return field angle is achieved.

In this manner, the respective ranges of the zoom-out area ZO and the zoom-in area ZI are dynamically changed according to the change in the orientation of the camera and the image capturing state (hand-held state/fixed state). This can efficiently prevent the subject from going out of the frame while preventing a malfunction due to hand shake or the like. In addition, the area of the zoom-out area ZO or the zoom-in area ZI may be changed according to either one of the orientation of the camera and the image capturing state (hand-held state/fixed state) In addition, the area of only either one of the zoom-out area ZO and the zoom-in area ZI may be changed.

Next, a zooming operation for keeping a ratio of the subject to the screen within a predetermined range will be described. In the present exemplary embodiment, by automatically performing a zooming operation when the size of a detected subject changes to be larger than a predetermined time of a reference size, the size of the subject is controlled to be kept within the predetermined range from the reference size.

Figure 6A:
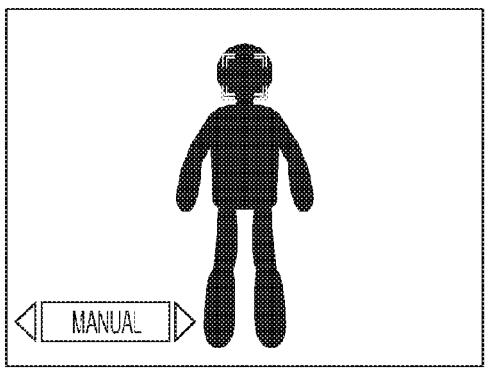
FIGS. 6A to 6E are diagrams each illustrating a composition setting in a case in which a subject is a human figure.

First, the setting of a range (composition) for fitting a subject serving as a tracking target within a screen will be described with reference to FIGS. 6A to 6E. FIGS. 6A to 6E are explanatory diagrams each illustrating a composition setting in a case in which a subject is a human figure. FIG. 6A illustrates an example of screen display in a case in which a composition setting is set to "manual". When the composition setting is set to "manual", the photographer performs a manual zooming operation by operating a zoom lever while viewing the human figure in the screen to change the size of the face to be tracked. The subject size obtained at this time is stored into the memory 118 as a reference size.

Figure 6B:
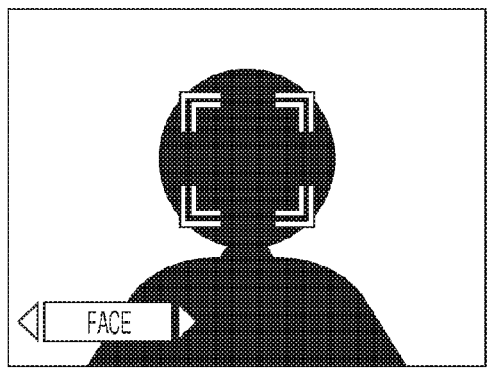
Figure 6C:
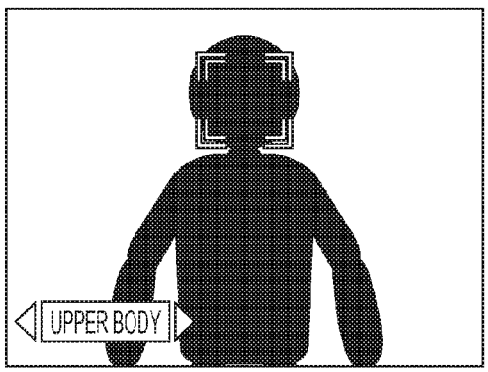
Figure 6D:
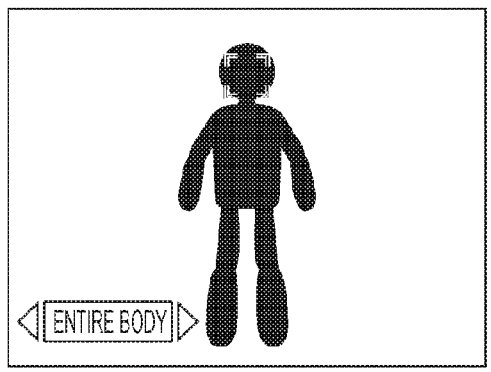

FIG. 6B illustrates an example of screen display in a case in which a composition setting is set to "face". When the composition setting is set to "face", a size with which the face is fitted within the screen is calculated as a reference size according to the orientation of the camera and the direction of the face, and the calculated reference size is stored into the memory 118. Similarly, FIG. 6C illustrates an example of screen display in a case in which a composition setting is set to "upper body", and FIG. 6D illustrates an example of screen display in a case in which a composition setting is set to "entire body". In each of FIGS. 6C and 6D, a reference size is calculated so as to be a size set on the screen, and the calculated reference size is stored into the memory 118.

Figure 6E:
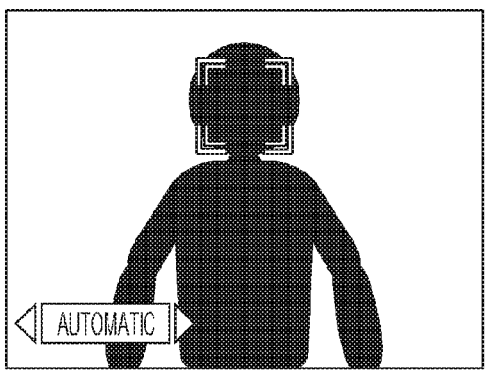

FIG. 6E illustrates an example of screen display in a case in which a composition setting is set to "automatic". When the composition setting is set to "automatic", the automatic zooming control unit 122 determines an appropriate composition based on the subject position and the subject size within the screen, the number of subjects, the orientation of the camera, and the like. Furthermore, the automatic zooming control unit 122 calculates a reference size so as to be the determined composition, and stores the calculated reference size into the memory 118. The calculation method of the reference size will be described later with reference to FIG. 11.

The photographer can change a composition setting by operating left and right buttons of the operation unit 117 from an image capturing screen or performing selection on a setting menu. When the change operation of the composition setting is performed, the automatic zooming control unit 122 updates composition setting information stored in the memory 118. In addition, FIGS. 6A to 6E illustrate the examples of setting the composition to the respective compositions of "manual", "face", "upper body", "entire body", and "automatic" in a case in which the subject is a human figure. The composition setting is not limited to these settings. Only part of the five compositions illustrated as examples may be set or another composition may be included. In addition, in a case in which the subject is an object, for example, the composition may be set to any of "manual", "large", "medium", "small", and "automatic".

The zooming operation for keeping a ratio of the subject to the screen within a predetermined range will be described using an example case in which a composition setting is set to "manual". FIGS. 5A to 5C illustrate an example in which, when a human figure serving as a subject comes close to the camera, the camera automatically performs a zooming operation so as to fit a ratio of the subject to the screen within a predetermined ratio. In FIGS. 5A to 5C, face tracking frames 500a to 500f are displayed in such a manner as to surround face areas as feature areas of the human figure serving as a subject. Thus, the description will now be given assuming that the size of the face tracking frame=subject size.

FIG. 5A illustrates a field angle obtained when a subject is designated according to a subject designation method to be described later. The size of the face tracking frame 500a obtained at the designation of the subject is stored into the memory 118 as a reference subject size (reference size).

FIG. 5B illustrates a field angle obtained when the subject comes close to the camera in a state in which a zoom magnification is unchanged from the state in FIG. 5A. For example, a start size of a zoom-out operation is set to a size being 150% of the size of the face tracking frame 500a, which is a reference subject size. When the relationship between the face tracking frames satisfies the face tracking frame 500b>the face tracking frame 500a×150% (changes more than a predetermined change amount with respect to the reference size), the automatic zooming control unit 122 determines to start the zoom-out operation.

FIG. 5C illustrates a field angle obtained by performing a zoom-out operation corresponding to a predetermined zoom magnification from a field angle in FIG. 5B, and the face tracking frame 500c. In this example, the predetermined zoom magnification is set at 1/1.5 times in consideration of the rate of change (150%) from the reference subject size of the face tracking frame size that is set when the zoom-out operation is started. Then, if the subject further comes close to the camera, by further performing a zoom-out operation toward a wide-angle direction, the subject can be continuously fitted within the predetermined ratio. Thus, the photographer can concentrate only on the operation of the release switch.

On the other hand, FIGS. 5D to 5F illustrate an example in which, when a human figure serving as a subject goes away from the camera, the camera automatically performs a zooming operation so as to fit a ratio of the subject to the screen within a predetermined ratio. FIG. 5D illustrates a field angle obtained when a subject is designated according to the subject designation method to be described later. The size of the face tracking frame 500d obtained at the designation of the subject is stored into the memory 118 as a reference subject size (in a case in which a composition setting is set to "manual").

FIG. 5E illustrates a field angle obtained when the subject goes away from the camera in a state in which a zoom magnification is unchanged from the state in FIG. 5D. For example, a start size of a zoom-in operation is set to a size being 50% of the size of the face tracking frame 500d, which is a reference subject size. When the relationship between the face tracking frames satisfies the face tracking frame 500e<the face tracking frame 500d×50% (changes more than a predetermined change amount with respect to the reference size), and the face tracking frame 500e is fully contained in the zoom-in area ZI, the automatic zooming control unit 122 determines to start the zoom-in operation. In this example, the zoom-in area ZI is set on the inner side of a field angle 502 obtained by performing the zoom-in operation corresponding to a predetermined zoom magnification from the field angle illustrated in FIG. 5E.

FIG. 5F illustrates a field angle (equivalent to the field angle 502) obtained by performing the zoom-in operation corresponding to the predetermined zoom magnification from the field angle illustrated in FIG. 5E, and the face tracking frame 500f. In this example, the predetermined zoom magnification is set at 1/0.5 times in consideration of the rate of change (50%) from the reference subject size of the face tracking frame size that is set when the zoom-in operation is started.

The processing for preventing the subject from going out of the frame in a case in which the subject is a human figure has been described with reference to FIGS. 4A to 4C. In addition, the processing for fitting the ratio of the subject size to the screen within the predetermined range in a case in which the subject is a human figure has been described with reference to FIGS. 5A to 5F. In addition, also in a case in which a subject serving as a tracking target is an object, similarly to the case in which the subject is a human figure, the zooming operation start determination for subject size holding control that has been described with reference to FIGS. 5A to 5F may be performed. In addition, also in a case in which the composition setting is set to any of the settings other than "manual", a zooming operation is automatically performed according to each reference size, similarly to the operation described with reference to FIGS. 5A to 5F.

<Automatic Zooming Function Processing Example>

Figure 7:
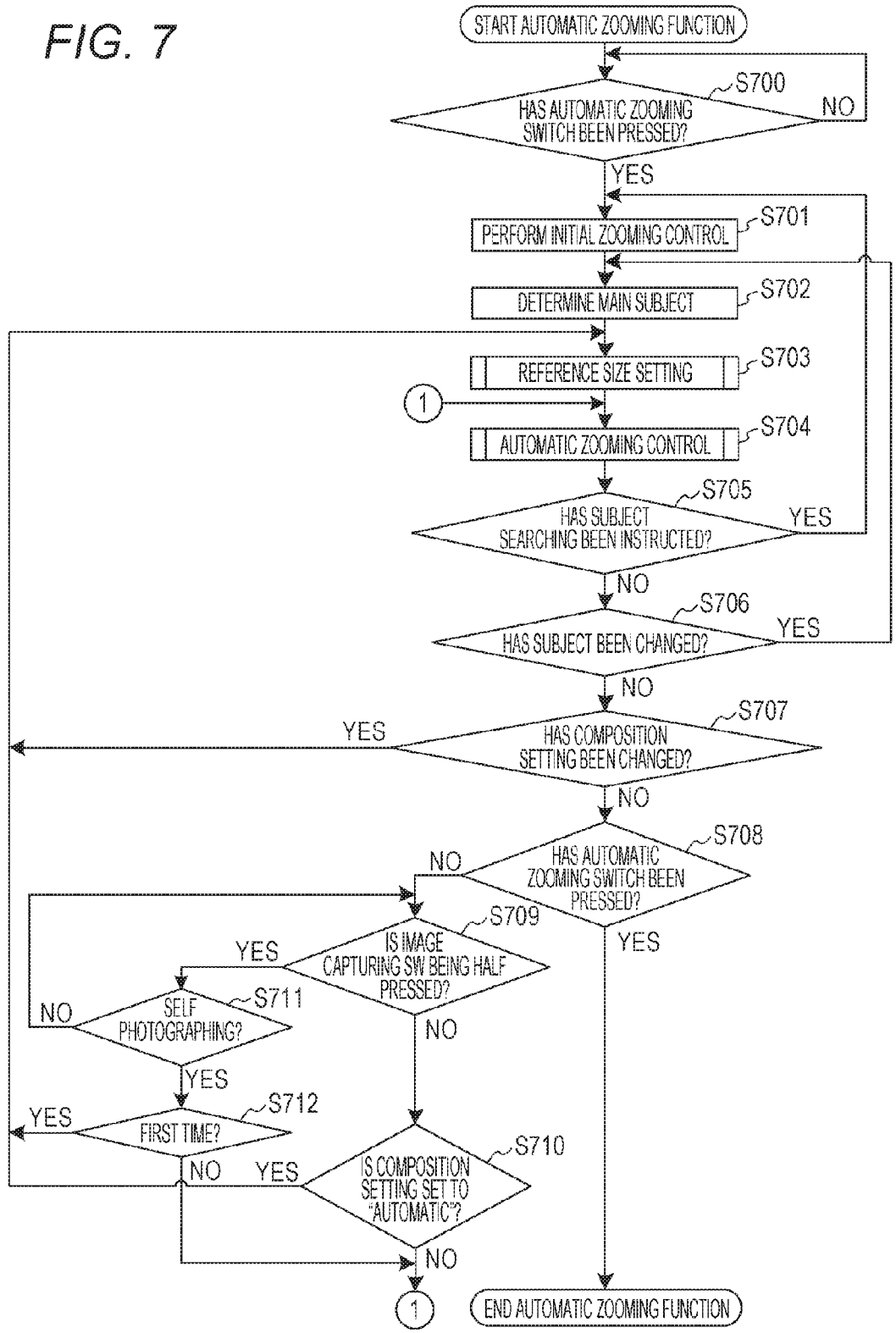
FIG. 7 is a flowchart illustrating a processing flow of an automatic zooming function.

Next, automatic zooming function processing will be described with reference to FIG. 7. FIG. 7 is a flowchart illustrating an example of the entire processing of the automatic zooming function. Unless otherwise specified, the automatic zooming function illustrated in FIG. 7 is assumed to be performed based on a command from the system control unit 114 (the automatic zooming control unit 122).

First, in step S700, the automatic zooming control unit 122 determines the press state of the automatic zooming operation switch of the operation unit 117. When the automatic zooming operation switch has been pressed (YES in step S700), the processing proceeds to step S701. When the switch has not been pressed (NO in step S700), the determination processing in step S700 is repeated.

Immediately after the automatic zooming function has been started, or when a subject searching button of the operation unit 117 has been pressed (YES in step S705), control in step S701 is executed. In step S701, the automatic zooming control unit 122 performs zooming control toward an initial value of a focal length.

For example, assume that a wide-angle lens with a short shortest focal length of the lens barrel 101 is used, and the zoom position in step S701 is at a wide-angle end. When the photographer desires self photographing with a composition in which the upper body of the photographer appears in a large size, normally, the photographer needs to operate the zoom lever toward a telephoto direction or move the digital camera 100 close to the face, by himself or herself. The photographer, however, may feel inconvenience of performing a zoom lever operation by himself or herself. In addition, if the digital camera 100 is brought close to the face, it may become difficult to set a field angle while viewing the display unit 109. On the other hand, when the automatic zooming function is started in step S701, if the focal length has been already set to the telephoto direction, the face of the photographer may fail to be fitted within a field angle, and it may be accordingly difficult for the subject detection unit 123 to detect the face.

Thus, in step S701, zooming control is performed with a target position set to a focal length initial value for facilitating the field angle setting and the face detection to be performed by the subject detection unit 123. In addition, when the self photographing detection unit 126 determines self photographing, an initial value for self photographing may be set. For example, as a focal length with which the upper body of the photographer is fitted when the photographer naturally stretches his or her hand to the front side to hold the digital camera 100, 40 mm in 35 mm equivalent focal length is set as an initial value for self photographing. In addition, a focal length initial value is not limited to this value.

In step S702, a main subject is determined. The main subject serves as a target for the automatic zooming control. Specifically, first, as described above, the subject detection unit 123 detects a face within a field angle. At this time, a plurality of faces may be detected. In the case of self photographing, it is desirable to determine the photographer to be a main subject. Thus, the face of the photographer may be determined from among the detected faces. As a method for determining the face of the photographer, the following methods may be used. As one example, there is a method of searching for a face having a feature similar to the feature of a preregistered face of a photographer, using a known face authentication technique. As another method, there is a method of determining a face having the largest face size, to be a photographer. In addition, when an operation of changing an automatic zooming target subject is performed as described later, a main subject is switched to another subject.

In step S703, the size of a subject to be tracked is set as a reference size. The reference size setting processing performed in step S703 will now be described with reference to FIGS. 11 to 17.

Figure 11:
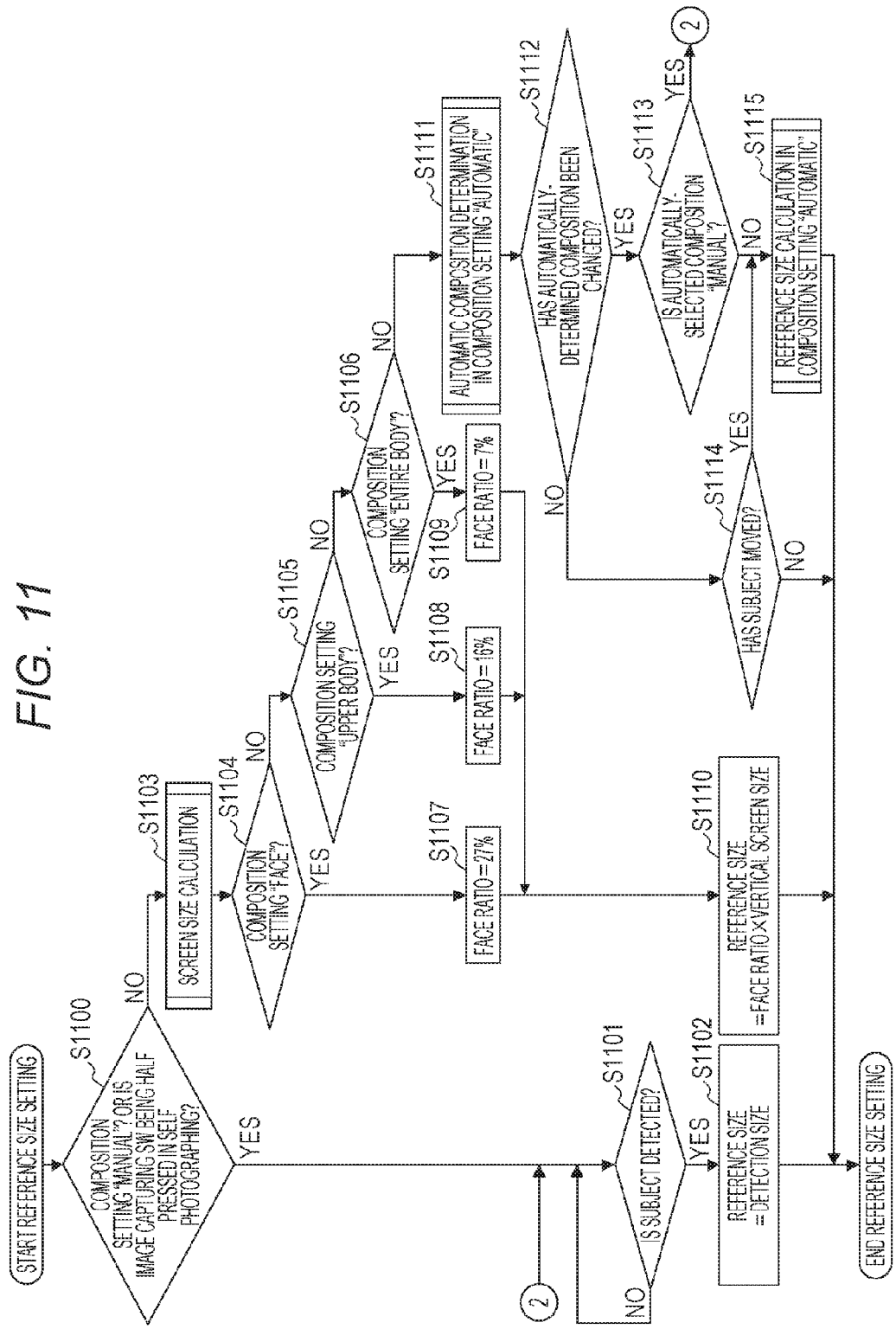
FIG. 11 is a flowchart illustrating setting processing of a reference size.

FIG. 11 is a flowchart illustrating an example of the reference size setting processing in a case in which a subject is a human figure. First, in step S1100, the automatic zooming control unit 122 determines whether the composition setting stored in the memory 118 is the above-described "manual", and determines whether the image capturing SW 127 is being half pressed in self photographing. When the composition setting is set to "manual" or when the image capturing SW 127 is being half pressed in self photographing (YES in step S1100), the processing proceeds to step S1101. When the composition setting is set to any of the settings other than "manual", and the image capturing SW 127 is not being half pressed in self photographing (NO in step S1100), the processing proceeds to step S1103.

In step S1101, the automatic zooming control unit 122 determines whether the subject detection unit 123 detects a face. The determination is repeated until a subject is detected. When the subject is detected (YES in step S1101), the processing proceeds to step S1102.

In step S1102, the automatic zooming control unit 122 stores the size of the detected subject into the memory 118 as a reference size, and the processing ends. The processing is executed only when the composition setting is set to "manual" for the first time, or when the image capturing SW 127 is half pressed in self photographing for the first time.

On the other hand, in step S1103, the automatic zooming control unit 122 calculates a screen size based on the orientation information of the camera that has been determined by the orientation detection unit 124. The screen size is used for the reference size calculation in steps S1111, S1604, S1605, S1612, and S1613 that are to be described later.

The screen size calculation processing will now be described with reference to FIG. 12. In the present exemplary embodiment, an example in which the screen size of a still image is defined as long side×short side=640×480, and the screen size of a movie is defined as long side×short side=640×360 is described. The screen sizes, however, are not limited to these sizes.

Figure 12:
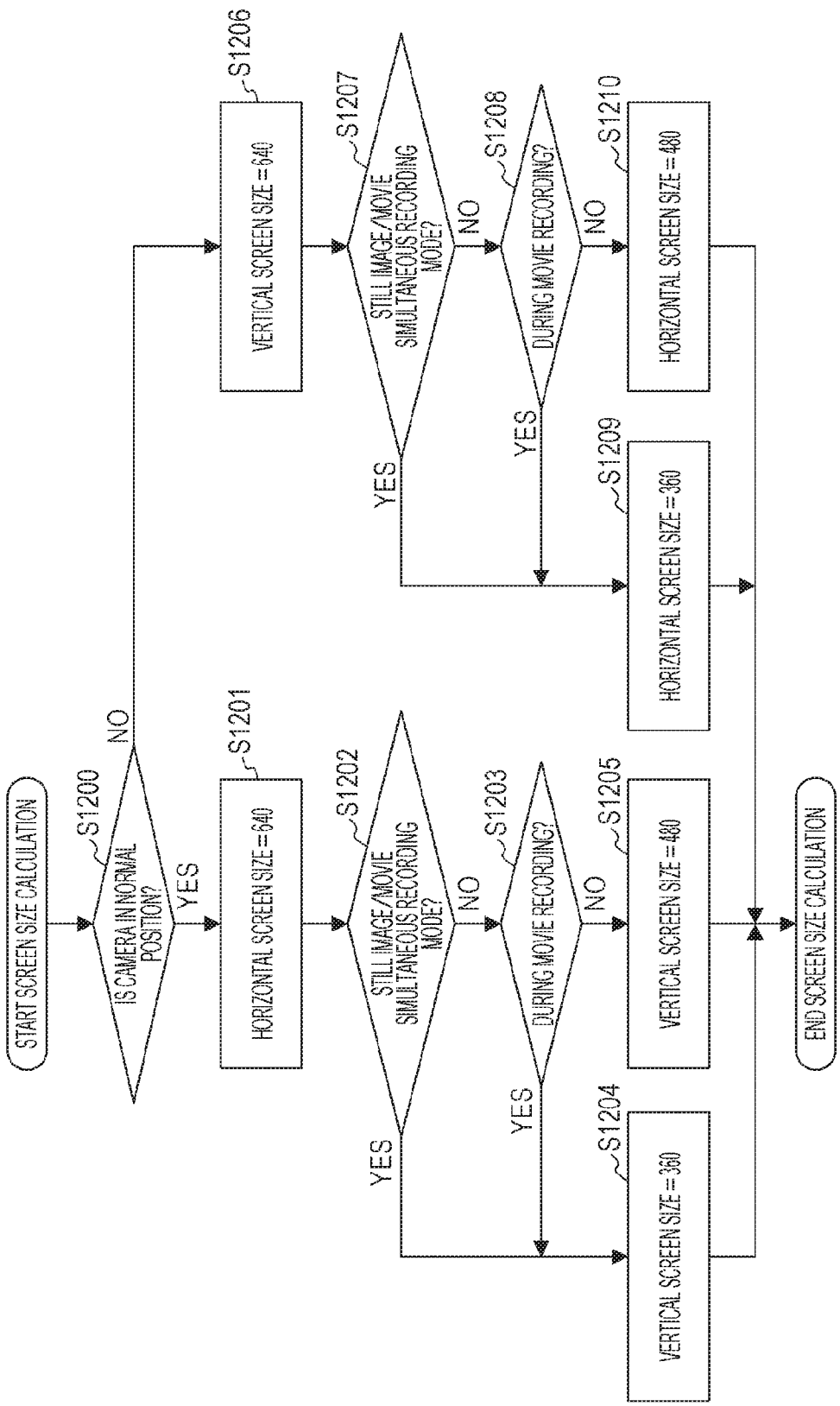
FIG. 12 is a flowchart illustrating calculation processing of a screen size.

FIG. 12 is a flowchart illustrating an example of the screen size calculation processing. In step S1200, it is determined whether the camera is held in the normal position or held in the vertical position, based on the detection information obtained by the orientation detection unit 124. When it is determined that the camera is held in the normal position (YES in step S1200), the processing proceeds to step S1201. When it is determined that the camera is held in the vertical position (NO in step S1200), the processing proceeds to step S1206.

When the camera is held in the normal position (YES in step S1200), in step S1201, the automatic zooming control unit 122 sets the long side size 640 as a screen size in the horizontal direction, and the processing proceeds to step S1202. In step S1202, the automatic zooming control unit 122 determines whether the camera is in a mode in which a still image and a movie can be simultaneously recorded (still image/movie simultaneous recording mode). The still image/movie simultaneous recording mode refers to a mode in which, by pressing the release switch of the operation unit 117 while a movie is being recorded, a still image can be simultaneously recorded, and the status of a framing operation performed immediately before the still image recording can be automatically recorded as a movie. When it is determined in step S1202 that the camera is in the still image/movie simultaneous recording mode (YES in step S1202), processing of comparing a short side size of a movie with a short side size of a still image, and setting a smaller size as a vertical screen size is performed. The processing is performed for preventing a subject from going out of a frame in both field angles of the still image and the movie, by performing automatic zooming in accordance with a smaller screen size. Thus, in the present exemplary embodiment, when the camera is in the still image/movie simultaneous recording mode (YES in step S1202), the processing proceeds to step S1204, in which the automatic zooming control unit 122 sets a short side size 360 of the movie as a vertical screen size.

On the other hand, when it is determined in step S1202 that the camera is not in the still image/movie simultaneous recording mode (NO in step S1202), the processing proceeds to step S1203. In step S1203, the automatic zooming control unit 122 determines whether the camera is performing movie recording or still image framing. When it is determined that the camera is performing movie recording (YES in step S1203), the processing proceeds to step S1204, in which the automatic zooming control unit 122 sets a short side size 360 of the movie as a vertical screen size. When it is determined that the camera is performing still image framing (NO in step S1203), the processing proceeds to step S1205, in which the automatic zooming control unit 122 sets a short side size 480 of the still image as a vertical screen size.

On the other hand, when it is determined in step S1200 that the camera is held in the vertical position (NO in step S1200), the processing proceeds to step S1206. The processing in steps S1206 to S1210 is processing similar to the processing in steps S1201 to S1205 except that the setting of a "vertical screen size" is replaced with the setting of a "horizontal screen size". Thus, the description will be omitted. In the present exemplary embodiment, the description has been given of an example in which the screen size of the still image is 4:3 and the screen size of the still image is 16:9. Nevertheless, the screen size may be changed according to the setting of the aspect ratio. As a result, the ratio of a human figure to a screen can be made constant regardless of an aspect ratio. In addition, as the still image/movie simultaneous recording mode, the description has been given of an example in which the still image and the movie differ from each other in screen size. Alternatively, the camera may be configured to simultaneously record a plurality of still images and movies with different screen sizes.

When the screen size is determined in step S1103 in FIG. 11, the processing proceeds to step S1104. When the composition setting stored in the memory 118 is any of "face", "upper body", and "entire body", in steps S1104 to S1109, the automatic zooming control unit 122 determines a ratio of a face size to the screen (face ratio) according to a composition setting. The face ratio in the present exemplary embodiment indicates the ratio of a length in the vertical direction of a face tracking frame to the screen. Alternatively, the face ratio may indicate a ratio of a length in the horizontal direction or an area ratio. For example, when the composition setting is "face" (YES in step S1104), in step S1107, the face ratio is set at 27%. When the composition setting is "upper body" (YES in step S1105), in step S1108, the face ratio is set at 16%. When the composition setting is "entire body" (YES in step S1106), in step S1109, the face ratio is set at 7%. When the face ratio is determined in steps S1104 to S1109, the processing proceeds to step S1110.

In step S1110, the automatic zooming control unit 122 calculates a reference size by multiplying the vertical screen size calculated in step S1103, by the face ratio determined in steps S1104 to S1109. This is a method of calculating a reference size from a face ratio with respect to the screen size in the vertical direction assuming that the subject is a standing human figure. If the subject detection unit 123 can determine the direction of the face, the direction of the screen size may be determined based on the upper and lower directions of the face on the screen. Furthermore, when the calculated reference size is stored into the memory 118, the reference size setting processing ends. Through the processing, when the composition setting is any of "face", "upper body", and "entire body", a size having a face ratio with respect to the screen size that is predetermined according to a corresponding composition setting is set as a reference size.

When it is determined in step S1106 that the composition setting is not "entire body", that is, the composition setting is "automatic", the processing proceeds to step S1111. In step S1111, the automatic zooming control unit 122 automatically determines an appropriate composition according to an image capturing state, the number of subjects, the movement of the subject, and the like.

The automatic composition determination processing in the composition setting "automatic" that is performed in step S1111 will be described with reference to FIG. 13. The composition setting "automatic" is a mode in which composition adjustment can be performed more easily by the camera determining an image capturing scene and automatically selecting an appropriate composition.

Figure 13:
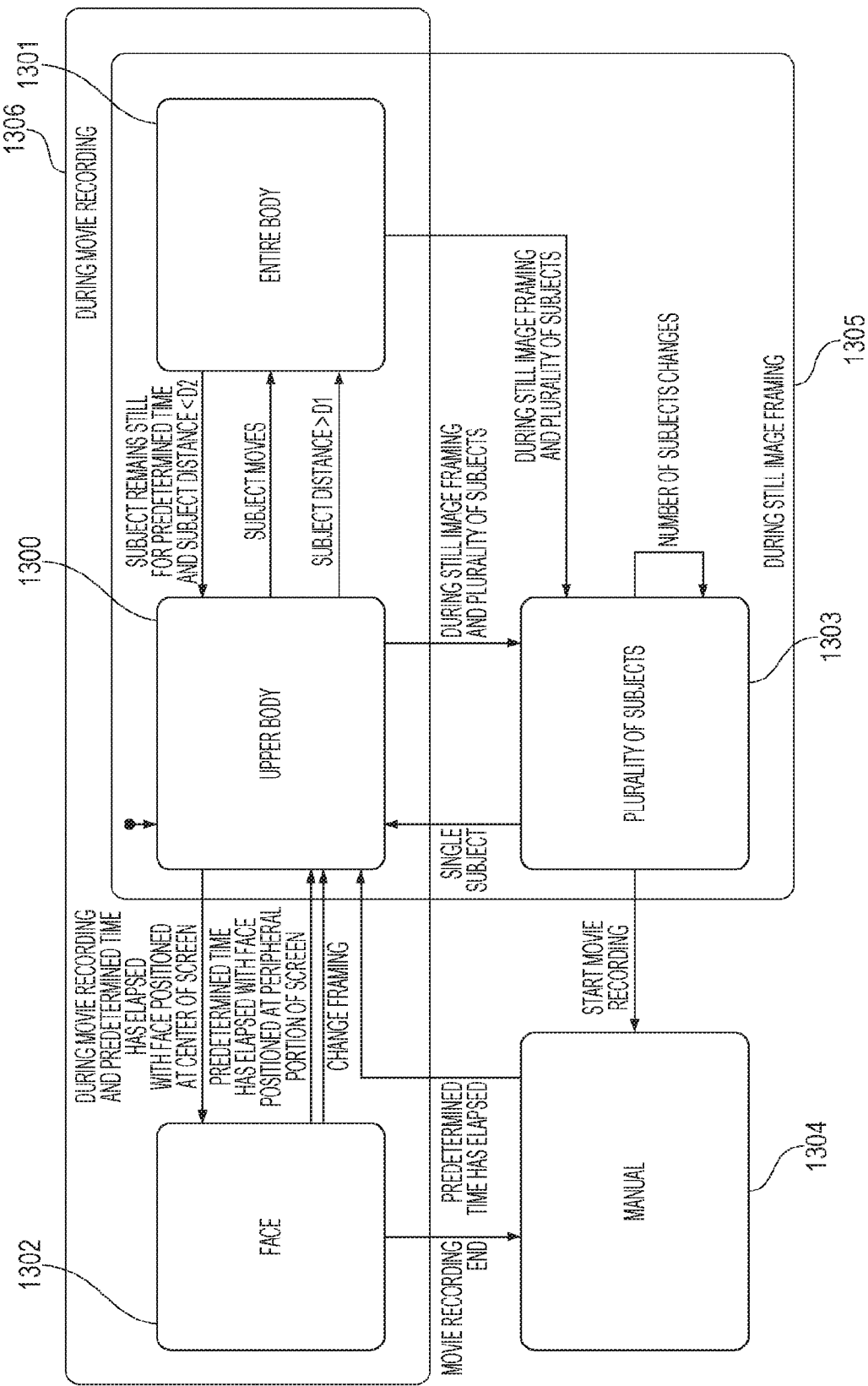
FIG. 13 is a transition diagram illustrating automatic composition determination in a composition setting "automatic".

FIG. 13 is a transition diagram of compositions automatically selected in the present exemplary embodiment. In the present exemplary embodiment, processing of selecting an appropriate composition according to an image capturing scene from among five types of compositions including upper body 1300, entire body 1301, face 1302, a plurality of subjects 1303, and manual 1304 is performed. In the composition adjustment operation, in still image recording, it is necessary to instantaneously set the size of a subject to an appropriate size before the recording. On the other hand, in movie recording, it is necessary to constantly set the size of a subject to an appropriate size during the recording. For example, a moving subject is followed or a stationary subject is zoomed in. In addition, in movie recording, image data obtained during a zoom-in operation or a zoom-out operation that is performed due to the change in composition is recorded. Thus, by changing the composition at an appropriate timing, an effective video can be recorded. In this manner, an appropriate composition is different between still images and movies.

Thus, in the present exemplary embodiment, processing for changing a composition to be selected according to an operation state, between during still image framing 1305 and during movie recording 1306 is performed. In the present exemplary embodiment, during the still image framing 1305, any composition of the upper body 1300, the entire body 1301, and a plurality of subjects 1303 is selected. In addition, during the movie recording 1306, any composition of the upper body 1300, the entire body 1301, and the face 1302 is selected. In other words, the respective compositions of the upper body 1300 and the entire body 1301 can be selected in any image capturing state, whereas the composition of a plurality of subjects 1303 can be selected only during the still image framing 1305 and the composition of the face 1302 can be selected only during the movie recording 1306. In addition, three or more operation states may be provided, and composition options corresponding to each of the operation states may be provided. For example, in a case in which the self photographing detection unit 126 detects self photographing, the composition of "face" may be made selectable even during still image framing, or a composition transition condition may be made different from that in a case in which self photographing is not performed.

The determination condition of an image capturing scene and the transition of each composition will now be described. When the automatic composition determination processing in the composition setting "automatic" in step S1111 is started, the upper body 1300 is set as a composition in an initial state. The composition of the upper body 1300 is a composition selected when an image capturing scene is determined to be a scene for image-capturing a stationary single subject during the still image framing 1305 or during the movie recording 1306. In such a scene, by employing a composition in which the upper body of the subject is fitted within the screen, a composition with a moderately-zoomed in subject can be achieved.

In the composition of the upper body 1300, when the movement of the image capturing target subject is detected or when a distance from the camera to the subject is determined to be larger than a predetermined distance D1, the composition is changed to the entire body 1301. The composition of the entire body 1301 is a composition selected when an image capturing scene is determined to be a scene for image-capturing a moving subject or a distant subject, that is, a subject that is likely to go out of the screen, during the still image framing 1305 or during the movie recording 1306. In such a scene, by following the subject using a composition in which the entire body of the subject is fitted, the subject is prevented from going out of the screen as far as possible. Furthermore, in the composition of the entire body 1301, when it is detected that the image capturing target subject remains still for a predetermined time, and a distance from the camera to the subject is determined to be smaller than a predetermined distance D2, processing of returning the composition to the upper body 1300 is performed. The predetermined time refers to a preset reference time for determination.

The method for determining the movement and the stillness of the subject will now be described. When at least one of the amount of changes in position and size of the subject that have been detected by the subject detection unit 123, or a shake amount detected by the shake detection unit 125 in a state in which the subject is detected is larger than a predetermined amount, the image capturing target subject is determined to be moving. When the amounts of change in position and size of the subject that have been detected by the subject detection unit 123, and the shake amount detected by the shake detection unit 125 in a state in which the subject is detected have all remained equal or smaller than the predetermined amount for a predetermined time or more, the image capturing target subject is determined to be at rest. The duration time of the detection state is assumed to be measured by a measurement timer.

Furthermore, the method for calculating a distance from the camera to the subject will be described. First, a reference focal length and a subject distance with respect to a subject size are measured in advance and stored in the memory 118. The subject distance can be calculated by performing such calculation that subject distance=(reference subject distance×focal length×reference subject size)/(reference focal length×detection size), with respect to reference values stored in the memory 118. For example, when the reference values are a reference subject distance 2 m, a reference focal length 24 mm, and a reference subject size 20 pixels (pix), a subject with a detection size 40 pix is assumed to be detected at a focal length 120 mm. The subject distance in this case is estimated to be (2 m×120 mm×20 pix)/(24 mm×40 pix)=5 m.

Next, the composition selected when a plurality of subjects is detected within the screen will be described. When a plurality of subjects is detected within the screen in the composition of the upper body 1300 or the entire body 1301 during the still image framing 1305, processing of changing the composition to a plurality of subjects 1303 is performed. In addition, the number of subjects detected at the time is stored into the memory 118. The composition of a plurality of subjects 1303 is a composition selected when an image capturing scene is determined to be a scene of a group photo in which all of a plurality of subjects is fitted within a predetermined field angle during the still image framing 1305. In the state of the composition of a plurality of subjects 1303, whether the number of detected subjects has changed is determined. When the number of detected subjects has increased, it is considered that a new subject has entered the screen. Thus, the number of subjects stored in the memory 118 is immediately updated, and the composition is immediately changed. On the other hand, when the number of detected subjects has decreased, a subject may be temporarily in an undetectable state. For example, the subject may be looking away. Thus, if the composition is immediately changed, the undetectable subject may go out of the frame. In view of the foregoing, when the number of subjects has decreased, if the decreased state continues for a predetermined time or more, the number of subjects stored in the memory 118 is updated and the composition is changed. Furthermore, when the number of subjects becomes one, processing of returning the composition to the upper body 1300 is performed.

If a composition for fitting all subjects within a field angle is employed during the movie recording 1306, when a subject other than the image capturing target subject is moving around, a zooming operation may be erroneously started in response to the moving subject. Thus, even if a plurality of subjects is detected during the movie recording 1306, the composition is kept unchanged from the upper body 1300 or the entire body 1301 with only a main subject set as an image capturing target.

When the composition is set to the upper body 1300 during the movie recording 1306, if a face has been detected near the center of the screen for a predetermined time or more, processing of changing the composition to the face 1302 is performed. The composition of the face 1302 is a composition selected when an image capturing scene is determined to be a scene in which the photographer focuses on the face of the subject during the movie recording 1306. In such a scene, by employing a composition in which the face is further zoomed in as compared with the composition of the upper body, the face of the subject that is to be focused on can be recorded with a larger size. In addition, by changing a zooming speed to a speed extremely lower or higher than a normal speed during a zoom-in operation caused by this composition change, a further effective video can be recorded. Furthermore, in the composition of the face 1302, when the face has been detected near the peripheral portion of the screen for a predetermined time or more, or when it is determined that the photographer has changed framing, processing of returning the composition to the upper body 1300 is performed. As a method for determining the framing change, when a shake amount detected by the shake detection unit 125 in a state in which the subject detection unit 123 detects no subject is larger than a predetermined amount, it is determined that the photographer has changed framing.

During still image framing 1305, the photographer needs to keep the same composition to wait for a shutter release opportunity until a face orientation and face expression of an image capturing target become a desired state. In such a case, if a composition in which the face is zoomed in is employed, the composition may be different from a composition intended by the photographer. Thus, even if the face has been detected near the center of the screen for a predetermined time or more when the composition is set to the composition of the upper body 1300 during the still image framing 1305, the composition of the upper body 1300 is maintained.

Next, a composition selected when an image capturing state is changed according to the start/end of movie recording will be described. The compositions of the upper body 1300 and the entire body 1301 are compositions that can be selected both during the still image framing 1305 and during the movie recording 1306. Thus, in these compositions, even if an image capturing state is changed, the original composition is maintained. On the other hand, the compositions of a plurality of subjects 1303 and the face 1302 are compositions selected only either one of during the still image framing 1305 and during the movie recording 1306. Thus, when the movie recording is started in the composition of a plurality of subjects 1303 during the still image framing 1305, or when the movie recording is ended in the composition of the face 1302 during the movie recording 1306, it is considered that the composition is changed to the upper body 1300, which is a common composition. In this case, however, if a zooming operation starts in accordance with the start and the end of the movie recording, an image captured during the zooming operation may be recorded at the beginning of the movie, or the photographer may feel bothered during still image framing. Thus, if an image capturing state is changed in such a state, the composition is temporarily changed to the manual 1304. The manual 1304 is a composition in which the size of a main subject detected first after the composition change is set as a reference size. Thus, a zooming operation is not started only by changing an image capturing state, so that the photographer does not feel unpleasant sensation. In addition, even when the subject starts moving, the size of the subject within the screen can be maintained. Furthermore, when a predetermined time elapses in the composition of the manual 1304, processing of returning the composition to the upper body 1300 is performed.

As described above, in step S1111 in FIG. 11, when the composition setting is "automatic", the automatic zooming control unit 122 automatically determines an appropriate composition according to an image capturing state, the number of subjects, the movement of the subject, and the like. When the determined composition is stored into the memory 118, the processing proceeds to step S1112.

In step S1112, the automatic zooming control unit 122 determines whether the composition determined in step S1111 has been changed from the last composition (the composition selected in FIG. 13 has transitioned, or the number of subjects has changed in the state of a plurality of subjects 1303). When the composition has been changed (YES in step S1112), the processing proceeds to step S1113, in which the automatic zooming control unit 122 determines whether the selected composition is the manual 1304. When the selected composition is the manual 1304 (YES in step S1113), the processing proceeds to step S1101, and the automatic zooming control unit 122 stores the size of the subject detected first, into the memory 118 as a reference size. When the selected composition is not the manual 1304 (NO in step S1113), the processing proceeds to step S1115, in which the automatic zooming control unit 122 calculates a reference size in the composition setting "automatic". The reference size calculation method in the composition setting "automatic" will be described in detail later.

When it is determined in step S1112 that the composition has not been changed (NO in step S1112), the processing proceeds to step S1114. In step S1114, the automatic zooming control unit 122 determines whether the subject has moved within the screen. As a method for calculating the amount of movement of the subject within the screen, after a reference size is set in step S1115, the center position of a face tracking frame obtained immediately after a zooming operation is performed to a field angle having the set reference size is stored into the memory 118. Then, a distance from the position stored in the memory 118 to the center position of the detected face tracking frame is calculated as an amount of movement. In addition, the amount of movement within the screen may be calculated by adding the center position of the face tracking frame at every predetermined cycle. When the calculated movement amount becomes equal to or larger than a predetermined amount, the subject is determined to have moved. By normalizing this predetermined amount using the size of the detected face tracking frame (setting to a predetermined time of the size of the face tracking frame), an actual movement amount of the subject can be regarded as the same level regardless of the size of the subject within the screen. When it is determined in step S1114 that the subject is moving within the screen (YES in step S1114), the processing proceeds to step S1115, in which a reference size in the composition setting "automatic" is calculated. When it is determined that the subject is not moving within the screen (NO in step S1114), the reference size setting processing ends without the reference size being updated.

The reference size calculation processing in the composition setting "automatic" will now be described with reference to FIGS. 14A to 17. When the photographer selects any of the composition settings "face", "upper body", and "entire body", in step S1110 in FIG. 11, a reference size is calculated so that a ratio of the face to the screen size becomes constant. In this method, the same reference size is calculated regardless of the position of the subject on the screen. Thus, when the subject is on the peripheral portion of the screen, if a composition is changed so that the subject becomes larger (a zoom-in operation is performed), the subject may go out of the frame. When a reference size is calculated using the method, the photographer needs to perform framing so that the subject is located near the center of the screen. Thus, the method is not suitable for a case in which the subject is shifted from the screen center and captured together with a background. In addition, when there is a plurality of subjects, a reference size needs to be calculated using another method. Thus, when the composition setting is "automatic", the size of the subject is determined based on the composition determined in step S1111, and processing for calculating a reference size so that the subject is fitted within the screen regardless of the position of the detected subject is performed.

Figure 14A:
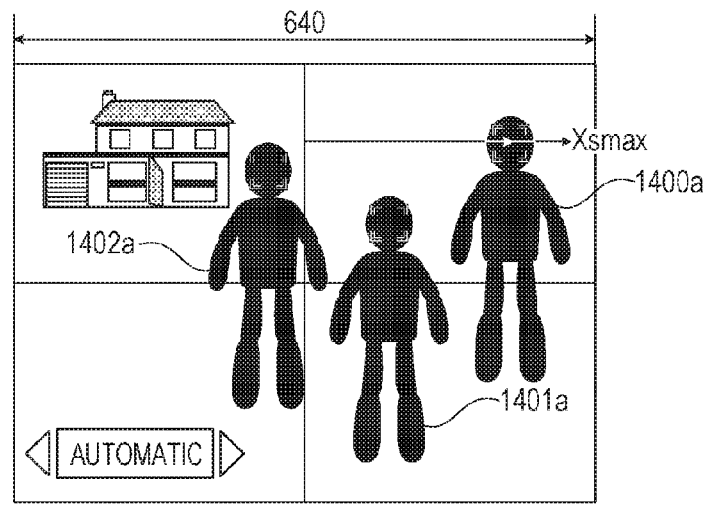
FIGS. 14A to 14C are diagrams illustrating an outermost subject position and a screen size.
Figure 14B:
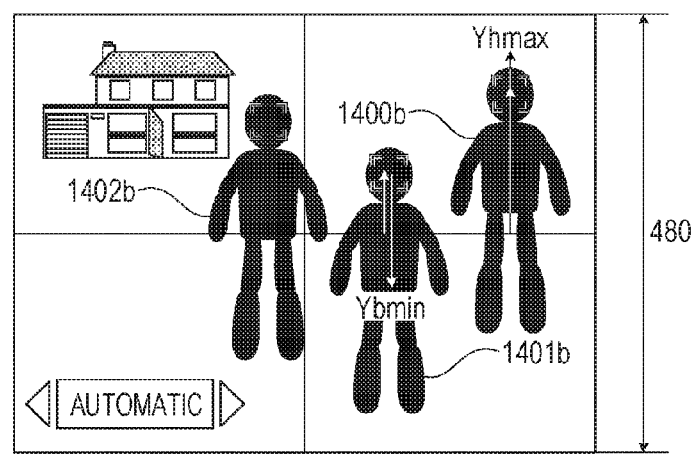
Figure 14C:
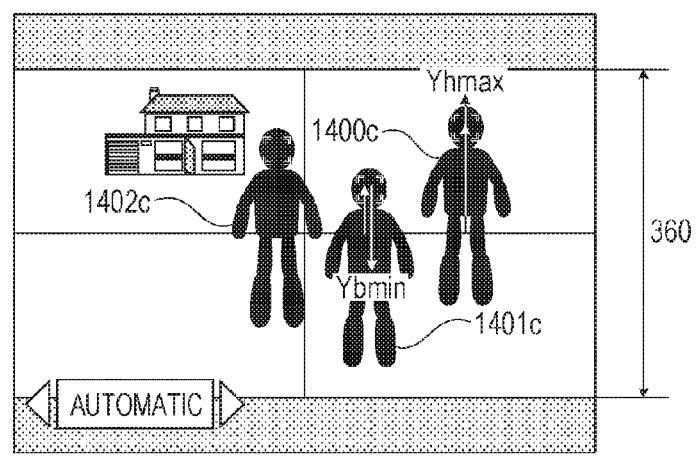
Figure 15:
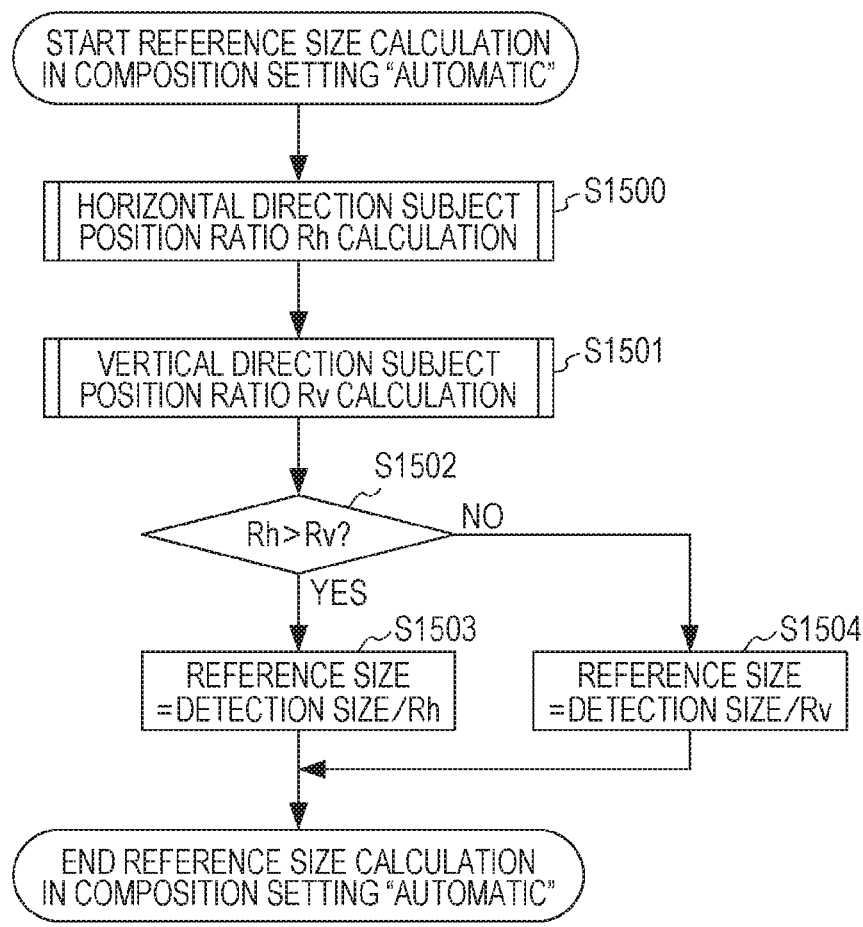
FIG. 15 is a flowchart illustrating calculation processing of a reference size in a composition setting "automatic".

FIGS. 14A to 14C are diagrams illustrating a relationship between the position of a subject located closest to the peripheral portion of the screen among a plurality of subjects and a screen size. FIGS. 14A and 14B illustrate screen examples during still image framing, and FIG. 14C illustrates a screen example during movie recording. FIGS. 14A to 14C each illustrate an example of a case in which there is a plurality of subjects. In addition, FIG. 15 is a flowchart illustrating the entire calculation processing of a reference size in the composition setting "automatic".

First, in step S1500, the automatic zooming control unit 122 calculates a subject position ratio Rh in the horizontal direction. The subject position ratio Rh in the horizontal direction refers to a ratio of a distance from the screen center to a horizontal position Xsmax near a shoulder portion of the subject located closest to the peripheral portion (hereinafter, referred to as shoulder position Xsmax)×2 to a predetermined ratio of a screen size in the horizontal direction. The predetermined ratio is changed according to the number of subjects arranged in the horizontal direction that is determined in step S1603 to be described later, and is set, for example, at 80% or 90% of the screen size in the horizontal direction.

Figure 16A:
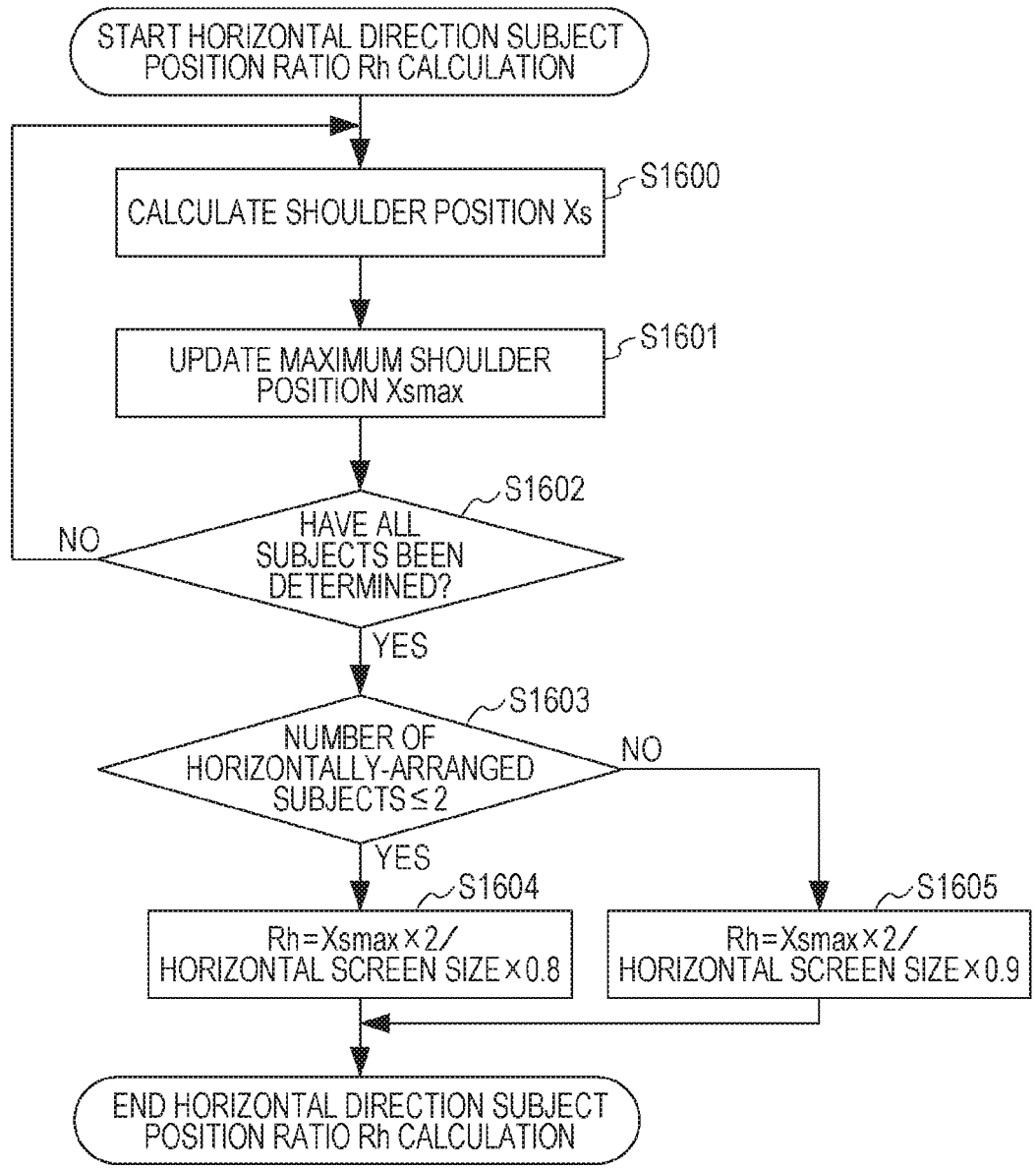
FIGS. 16A and 16B are flowcharts each illustrating calculation processing of a subject position ratio.

The calculation processing of the subject position ratio Rh in the horizontal direction will now be described. FIG. 16A is a flowchart illustrating the calculation processing of the subject position ratio Rh in the horizontal direction.

In step S1600, the automatic zooming control unit 122 estimates a shoulder position Xs of the subject based on the center position and the size of a face tracking frame of the subject. When the screen center is set as an origin (0, 0), the center position of the face tracking frame is set as (Xc, Yc), and the size of the face tracking frame is set as S, the shoulder position Xs on the screen peripheral side can be estimated by Xs=|Xc|+S×Ns. Ns represents the number of face tracking frames located in a distance from the center position of a face tracking frame to a shoulder position.

FIG. 17 lists setting examples of Ns. The value of Ns is changed according to the composition determined in step S1111. For example, when the determined composition is the composition of the face 1302, Ns=1 (in this case, a horizontal position near an ear instead of the shoulder position) is set. When the determined composition is any of the other compositions, Ns=2 is set. When the shoulder position Xs of the subject is calculated, the processing proceeds to step S1601.

In step S1601, when a maximum value Xsmax of the shoulder position is not stored in the memory 118, the automatic zooming control unit 122 stores the shoulder position Xs calculated in step S1600, as the maximum shoulder position Xsmax. When the maximum shoulder position Xsmax is stored, the shoulder position Xs calculated in step S1600 is compared with the maximum shoulder position Xsmax. When the shoulder position Xs is larger than the maximum shoulder position Xsmax, the maximum shoulder position Xsmax stored in the memory 118 is updated to the shoulder position Xs. When the maximum shoulder position is updated, the processing proceeds to step S1602.

In step S1602, the automatic zooming control unit 122 determines whether the shoulder positions Xs of all subjects have been calculated and the update of the maximum shoulder position Xsmax has been completed for all the subjects. When the update of the maximum shoulder position Xsmax has not been completed (NO in step S1602), the processing returns to step S1600, and the processing is repeated until the determination of the maximum shoulder position Xsmax is completed for all the subjects. When the update of the maximum shoulder position Xsmax has been completed for all the subjects (YES in step S1602), the processing proceeds to step S1603.

In step S1603, the automatic zooming control unit 122 determines the number of subjects arranged in the horizontal direction (the number of horizontally-arranged subjects). The purpose of the determination is to employ a composition in which subjects are located throughout the screen when there are a large number of subjects as in a group photo, and to employ a composition in which a blank space is left at the screen periphery when there are a small number of subjects. In addition, as a method for counting the number of subjects arranged in the horizontal direction, when face tracking frames are overlapped in the vertical direction (upper and lower directions of the screen), subjects with the overlapped face tracking frames are collectively counted as one subject. For example, when four human figure subjects are detected within the screen, if face tracking frames of two subjects among the four subjects are overlapped in the upper and lower directions of the screen, they are counted as three subjects. When it is determined in step S1603 that the number of subjects arranged in the horizontal direction is equal to or less than two (YES in step S1603), the processing proceeds to step S1604. When it is determined that the number of subjects arranged in the horizontal direction is equal to or larger than three (NO in step S1603), the processing proceeds to step S1605.

In steps S1604 and S1605, the automatic zooming control unit 122 calculates the subject position ratios Rh in the horizontal direction. When the number of subjects arranged in the horizontal direction is equal to or less than two (YES in step S1603), in step S1604, the horizontal direction subject position ratio Rh is calculated as a ratio of the maximum shoulder position Xsmax×2 to 80% of the horizontal screen size. In addition, when the number of subjects arranged in the horizontal direction is equal to or larger than three (NO in step S1603), in step S1605, the horizontal direction subject position ratio Rh is calculated as a ratio of the maximum shoulder position Xsmax×2 to 90% of the horizontal screen size. When the horizontal direction subject position ratio Rh is calculated, the processing ends.

Referring back to FIG. 15, in step S1501, the automatic zooming control unit 122 calculates a subject position ratio Rv in the vertical direction. The subject position ratio Rv in the vertical direction refers to a ratio of a distance from the screen center to a vertical position Yhmax of a head portion (maximum head position Yhmax) or a vertical position Ybmin of a body portion (minimum body position Ybmin) of the subject located closest to the peripheral portion×2 to a predetermined ratio of a screen size in the vertical direction. The predetermined ratio is set, for example, at 90% of the screen size in the vertical direction.

Figure 16B:
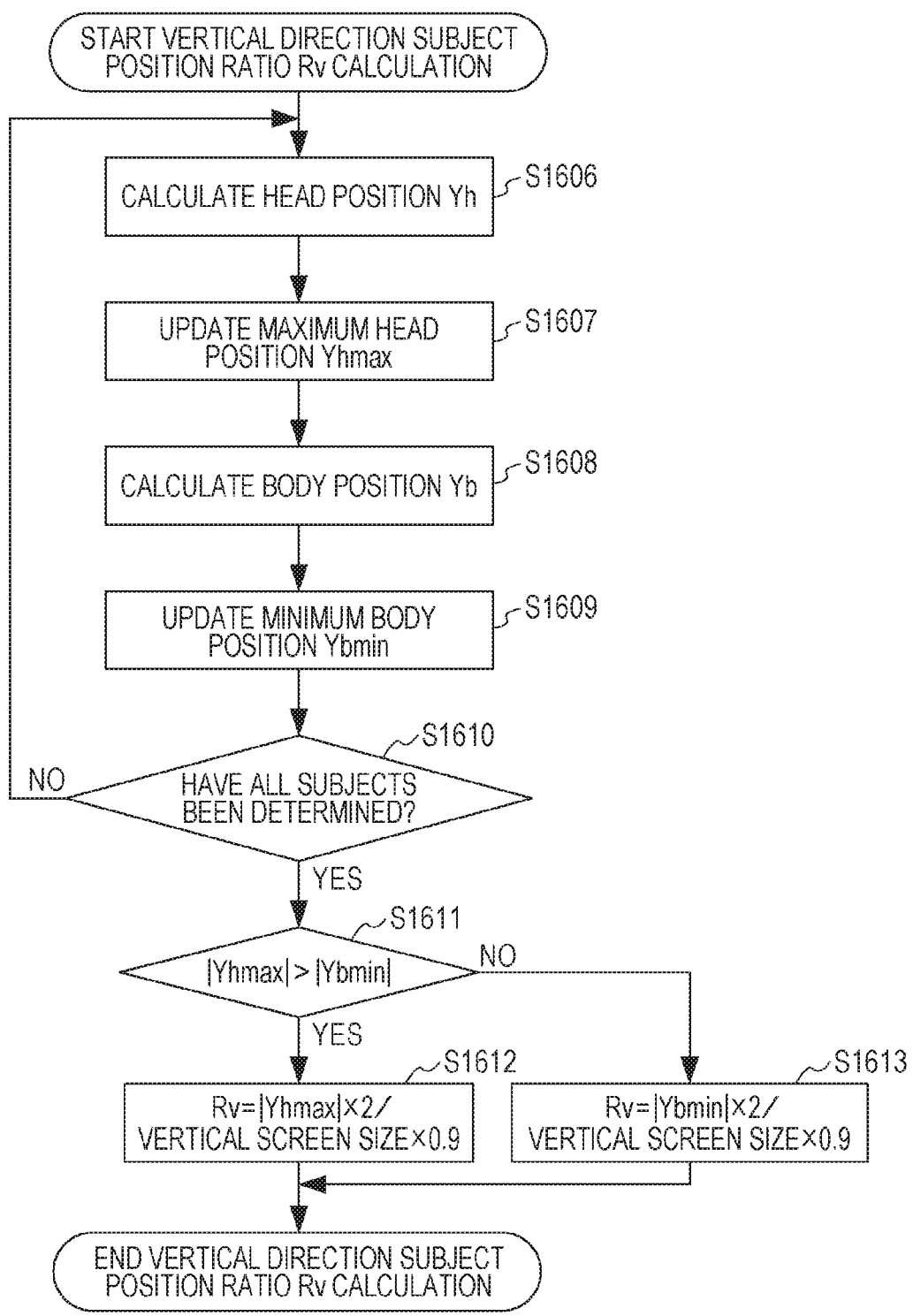

The calculation processing of the subject position ratio Rv in the vertical direction will now be described. FIG. 16B is a flowchart illustrating the calculation processing of the subject position ratio Rv in the vertical direction.

In step S1606, the automatic zooming control unit 122 estimates a head position Yh of the subject based on the center position and the size of a face tracking frame of the subject. The head position Yh can be estimated by Yh=Yc+S×Nh. Nh represents the number of face tracking frames located in a distance from the center position of a face tracking frame to a head position. FIG. 17 lists setting examples of Nh. As the value of Nh, Nh=1.5 is set regardless of the composition determined in step S1111. When the head position Yh of the subject is calculated, the processing proceeds to step S1607.

In step S1607, when a maximum value Yhmax of the head position is not stored in the memory 118, the automatic zooming control unit 122 stores the head position Yh calculated in step S1606, as the maximum head position Yhmax. When the maximum head position Yhmax is stored, the head position Yh calculated in step S1606 is compared with the maximum head position Yhmax. When the head position Yh is larger than the maximum head position Yhmax, the maximum head position Yhmax stored in the memory 118 is updated to the head position Yh. When the maximum head position is updated, the processing proceeds to step S1608.

In step S1608, the automatic zooming control unit 122 estimates a body position Yb of the subject based on the center position and the size of the face tracking frame of the subject. The body position Yb can be estimated by Yb=Yc−S×Nb. Nb represents the number of face tracking frames located in a distance from the center position of a face tracking frame to a body position. FIG. 17 lists setting examples of Nb. The value of Nb is changed according to the composition determined in step S1111. In the examples illustrated in FIG. 17, when the composition is the face 1302, Nb=1.5 is set, when the composition is the upper body 1300, Nb=5 is set, when the composition is the entire body 1301, Nb=10 is set, and when the composition is a plurality of subjects 1303, Nb=3.5 is set. These settings are made so that the body position comes to a position near a breast portion in the face 1302, to a lower lumbar portion in the upper body 1300, to a leg portion in the entire body 1301, and to an upper lumbar portion in a plurality of subjects 1303, in the respective compositions. When the body position Yb of the subject is calculated, the processing proceeds to step S1609.

In step S1609, when a minimum value Ybmin of the body position is not stored in the memory 118, the automatic zooming control unit 122 stores the body position Yb calculated in step S1608, as the minimum body position Ybmin. When the minimum body position Ybmin is stored, the body position Yb calculated in step S1608 is compared with the minimum body position Ybmin. When the body position Yb is smaller than the minimum body position Ybmin, the minimum body position Ybmin stored in the memory 118 is updated to the body position Yb. When the minimum body position is updated, the processing proceeds to step S1610.

In step S1610, the automatic zooming control unit 122 determines whether the head positions Yh and the body positions Yb of all subjects have been calculated and the update of the maximum head position Yhmax and the minimum body position Ybmin has been completed for all the subjects. When the update of the maximum head position Yhmax and the minimum body position Ybmin has not been completed (NO in step S1610), the processing returns to step S1606, and the processing is repeated until the determination of the maximum head position Yhmax and the minimum body position Ybmin is completed for all the subjects. When the update of the maximum head position Yhmax and the minimum body position Ybmin has been completed for all the subjects (YES in step S1610), the processing proceeds to step S1611.

In step S1611, the automatic zooming control unit 122 compares the respective absolute values of the maximum head position Yhmax and the minimum body position Ybmin with each other, and determines which of them is located closer to the screen periphery. When it is determined that the maximum head position Yhmax is located closer to the screen periphery (YES in step S1611), the processing proceeds to step S1612. When it is determined that the minimum body position Ybmin is located closer to the screen periphery (NO in step S1611), the processing proceeds to step S1613.

In steps S1612 and S1613, the automatic zooming control unit 122 calculates the subject position ratios Rv in the vertical direction. The vertical direction subject position ratio Rv is calculated as a ratio of the absolute value of the maximum head position Yhmax or the minimum body position Ybmin×2 to 90% of the vertical screen size. When the vertical direction subject position ratio Rv is calculated, the processing ends.

Next, in step S1502 in FIG. 15, the automatic zooming control unit 122 compares the subject position ratio Rh in the horizontal direction with the subject position ratio Rv in the vertical direction. Through the comparison, among the ratios of the respective distances from the screen center to the maximum shoulder position Xsmax, the maximum head position Yhmax, and the minimum body position Ybmin to the predetermined ratios of the screen sizes in the respective directions, the position with the highest ratio, i.e., the position closest to the screen periphery can be determined. When it is determined that the subject position ratio Rh in the horizontal direction is larger than the subject position ratio Rv in the vertical direction (the subject position ratio Rh in the horizontal direction is located closer to the screen periphery) (YES in step S1502), the processing proceeds to step S1503. On the other hand, when it is determined that the subject position ratio Rh in the horizontal direction is equal to or less than the subject position ratio Rv in the vertical direction (the subject position ratio Rv in the vertical direction is located closer to the screen periphery) (NO in step S1502), the processing proceeds to step S1504.

In steps S1503 and S1504, the automatic zooming control unit 122 calculates reference sizes based on a detection size of a main subject and the ratio of the subject position closest to the screen periphery that has been determined in step S1502. In step S1503, a reference size is calculated by the detection size/the horizontal direction subject position ratio Rh. In addition, in step S1504, a reference size is calculated by the detection size/the vertical direction subject position ratio Rv. In other words, a zooming operation is performed so that the size of the main subject becomes 1/horizontal direction subject position ratio Rh times or 1/vertical direction subject position ratio Rv times. Through the processing, a field angle can be set based on the composition determined in step S1111, without causing the subject within the screen to go out of the frame.

As described above, when the composition setting is "automatic" in step S1115 in FIG. 11, a subject position closest to the screen periphery in the horizontal and vertical directions is determined based on the composition determined in step S1111, and a reference size is calculated so that the determined position is fitted within the screen. Through the processing, the subject at any position within the screen can be fitted within an appropriate field angle without going out of the frame. In addition, regardless of whether there is a single subject or a plurality of subjects, a reference size can be calculated by the same processing. In the present exemplary embodiment, the direction of the screen size for calculating a reference size is determined assuming that a subject is a standing human figure. Nevertheless, if the subject detection unit 123 can determine the direction of the face, the direction of the screen size may be determined based on the upper and lower directions of the face on the screen. In addition, in the above description, examples of the composition determination and the reference size calculation in a case in which a subject is a human figure has been described. Alternatively, a subject may be an object. In this case, selected compositions are set as "large", "medium", "small", and "a plurality of objects", instead of "face", "upper body", "entire body", and "a plurality of subjects". In addition, the number of object tracking frames (equivalent to Ns, Nh, and Nb in the case of the human figure) for estimating a subject position according to a composition selected from among these compositions may be set.

When the reference size setting processing illustrated in FIG. 11 is completed, the processing proceeds to step S704 in FIG. 7. In step S704, the automatic zooming control unit 122 performs automatic zooming control based on subject information detected by the subject detection unit 123 and a reference size stored in the memory 118. The automatic zooming control will be described later with reference to FIG. 18.

When the processing of the automatic zooming control is completed, the processing proceeds to step S705. In step S705, the automatic zooming control unit 122 determines whether the photographer has pressed the subject searching button of the operation unit 117. When the subject searching button has been pressed (YES in step S705), the processing returns to step S701, and subject searching processing is performed. When the subject searching button has not been pressed (NO in step S705), the processing proceeds to step S706.

In step S706, the automatic zooming control unit 122 determines whether an automatic zooming target subject has been changed by operating the touch panel, a subject designation switch, or the like of the operation unit 117. When the subject has been changed (YES in step S706), the processing returns to step S702, in which main subject determination processing is performed. When the subject has not been changed (NO in step S706), the processing proceeds to step S707.

In step S707, the automatic zooming control unit 122 determines whether the composition setting has been changed by operating the left and right buttons of the operation unit 117 from an image capturing screen. When the composition setting has been changed (YES in step S707), the automatic zooming control unit 122 updates the composition setting stored in the memory 118, and then the processing returns to step S703, in which the reference size setting is performed. When the composition setting has not been changed (NO in step S707), the processing proceeds to step S708.

In step S708, the automatic zooming control unit 122 determines whether the automatic zooming operation switch of the operation unit 117 has been pressed. When it is determined that the automatic zooming operation switch has been pressed (YES in step S708), the automatic zooming function ends. On the other hand, when it is determined that the automatic zooming operation switch has not been pressed (NO in step S708), the processing proceeds to step S709.

In step S709, the automatic zooming control unit 122 determines whether the image capturing SW 127 is being half pressed. When the image capturing SW 127 is being half pressed (YES in step S709), the processing proceeds to step S711. When the image capturing SW 127 is not being half pressed (NO in step S709), the processing proceeds to step S710.

In step S710, the automatic zooming control unit 122 determines whether the composition setting stored in the memory 118 is "automatic". When the composition setting is "automatic" (YES in step S710), the processing returns to step S703, in which the reference size setting processing including the automatic composition determination is performed. When the composition setting is any of compositions other than "automatic" (NO in step S710), the processing returns to step S704, in which the automatic zooming control is continued.

On the other hand, when it is determined in step S709 that the image capturing SW 127 is being half pressed (YES in step S709), the processing proceeds to step S711, in which the automatic zooming control unit 122 determines whether the self photographing detection unit 126 detects self photographing. When self photographing is not performed (NO in step S711), the processing proceeds to step S709 so as not to start the automatic zooming control until the half press of the image capturing SW 127 is released. Because AF and AE are performed in response to the half press of the image capturing SW 127, the above-described control is performed for preventing appropriate focus and exposure from being changed by automatic zooming (optical zooming in this case). On the other hand, when it is determined in step S711 that self photographing is performed (YES in step S711), the processing proceeds to step S712.

In step S712, the automatic zooming control unit 122 determines whether it is the first processing after the image capturing SW 127 has been half pressed in the self photographing. When it is the first processing (YES in step S712), the processing returns to step S703, in which the reference size setting is performed. As described above, in the present exemplary embodiment, a reference size is set based on the size of the subject detected immediately after the image capturing SW 127 has been half pressed when self photographing is performed. When it is determined in step S712 that it is not the first processing (NO in step S712), the processing returns to step S704, in which the automatic zooming control is continued. In this case, the automatic zooming control that is based on the reference size determined immediately after the image capturing SW 127 has been half pressed is continued.

Figure 8B:
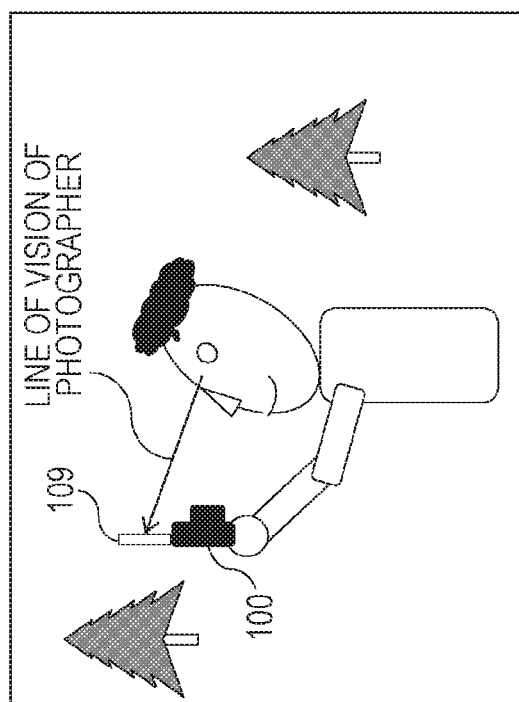
FIGS. 8A and 8B are diagrams illustrating states of self photographing.
Figure 8A:
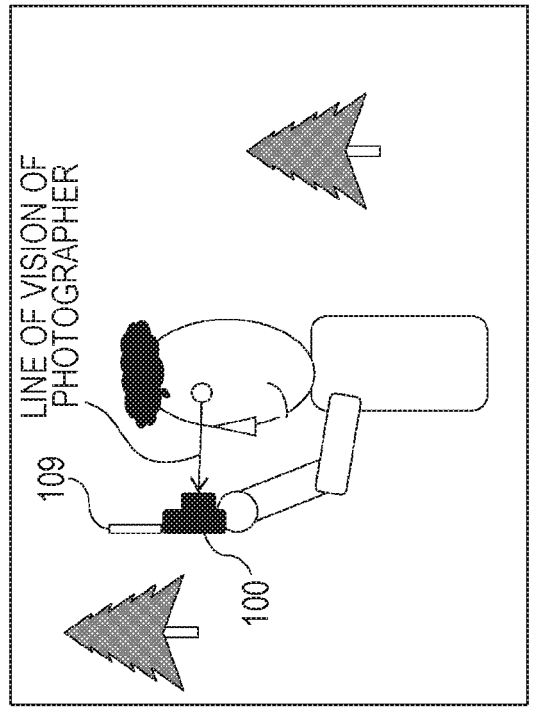

The reason for performing the above-described processing in a self photographing scene will now be described. As described above with reference to FIGS. 8A and 8B, in self photographing, the composition may unintentionally vary due to hand shake or the like, during a period from when the photographer completes image capturing preparation and half presses the image capturing SW 127 to when image capturing is started. In addition, it is assumed that image capturing is performed with the photographer looking away from the display unit 109 for capturing an image in which the photographer looks toward the camera direction. In such a case, if automatic zooming control is stopped in a state in which the image capturing SW 127 is being half pressed, image capturing may be performed without the photographer realizing that the composition has shifted, and the image capturing may fail to be performed with a composition desired by the photographer.

Thus, in the present exemplary embodiment, as described with reference to FIG. 7, when self photographing is performed, the automatic zooming control is executed even while the image capturing SW 127 is being half pressed. This can prevent the variation in composition that is caused when hand shake or the like occurs during a period from when the image capturing SW 127 is half pressed to when image capturing is started. In addition, when optical zooming is performed while the image capturing SW 127 is being half pressed, it is preferable to perform AF and AE again.

In addition, if the automatic zooming control is performed while the image capturing SW 127 is half pressed in self photographing, the size of the subject detected when the image capturing SW 127 has been half pressed is set as a reference size. This is for maintaining the composition set when the image capturing SW 127 is half pressed, considering that the photographer issues an image capturing preparation instruction (half presses the image capturing SW 127) after confirming that the composition has been adjusted to a desired composition. By setting the size of the subject detected when the image capturing SW 127 has been half pressed, as a reference size, in the automatic zooming control executed while the image capturing SW 127 is being half pressed, a composition intended by the photographer can be maintained.

Figure 18:
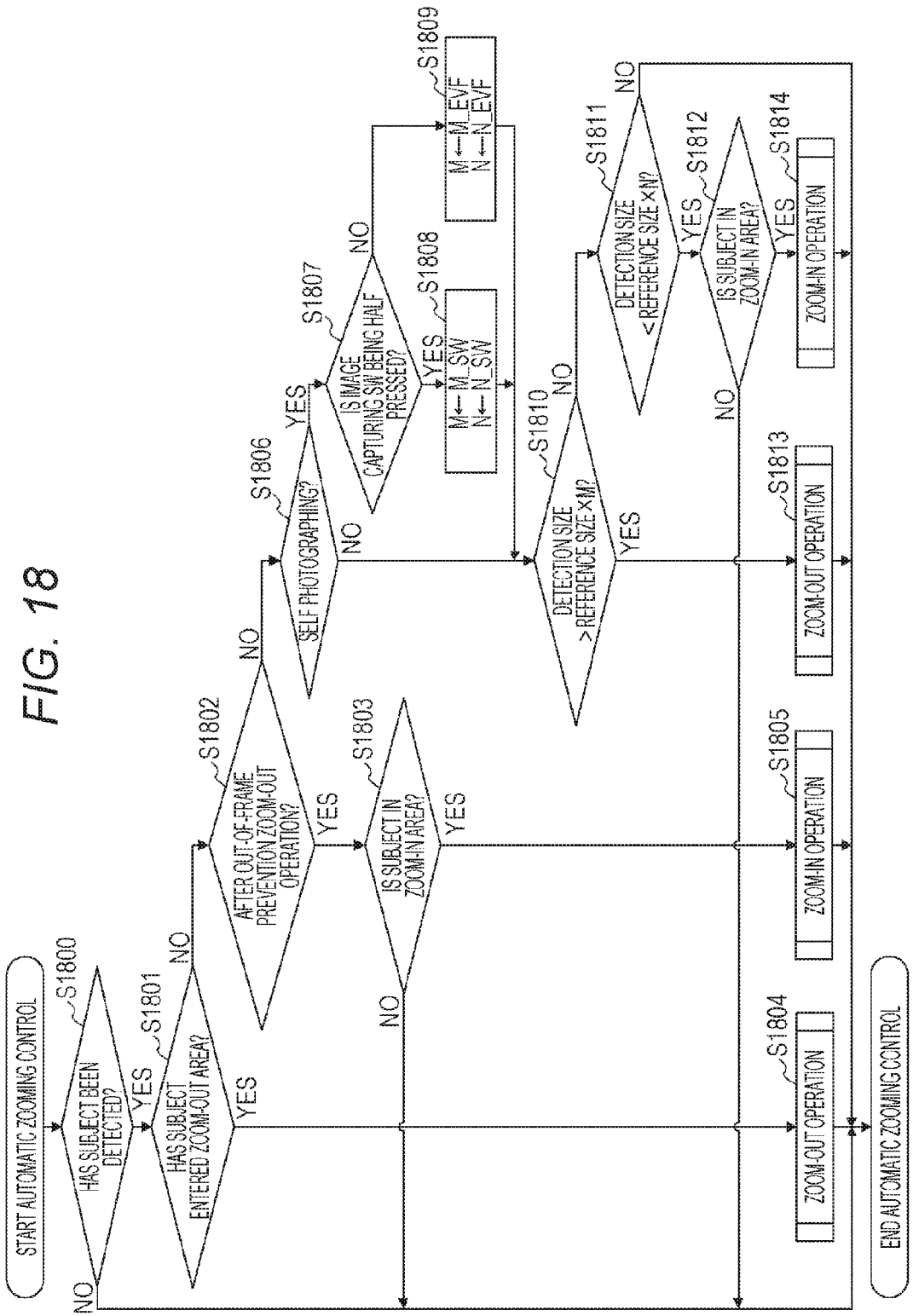
FIG. 18 is a flowchart illustrating processing of automatic zooming control.

Next, the automatic zooming control processing executed in step S704 in FIG. 7 will be described with reference to FIG. 18. FIG. 18 is flowchart illustrating the automatic zooming control processing according to the present exemplary embodiment.

First, in step S1800, the automatic zooming control unit 122 determines whether the subject detection unit 123 has detected a subject. When no subject has been detected in step S1800 (NO in step S1800), the automatic zooming control processing ends. When a subject has been detected in step S1800 (YES in step S1800), the processing proceeds to step S1801.

The determination in steps S1801 to S1803 is automatic zooming start determination processing for preventing a subject from going out of a frame (for out-of-frame prevention control), as described with reference to FIGS. 4A to 4C. In step S1801, the automatic zooming control unit 122 determines whether a subject tracking frame related to a subject to be tracked has entered the zoom-out area ZO. The zoom-out area ZO here corresponds to the zoom-out area ZO described with reference to FIGS. 4A to 4C. When it is determined in step S1801 that the subject tracking frame has entered the zoom-out area ZO (YES in step S1801), that is, when the subject is highly likely to go out of a frame, the processing proceeds to step S1804, in which a zoom-out operation is started. The zoom-out operation performed in this step corresponds to a zoom-out operation for out-of-frame prevention control. After the zoom-out operation is performed, the automatic zooming control ends.

On the other hand, when it is determined in step S1801 that the subject tracking frame has not entered the zoom-out area ZO (NO in step S1801), that is, when the subject is caught near the screen center, the processing proceeds to step S1802. In step S1802, the automatic zooming control unit 122 determines whether the last zooming operation is a zoom-out operation performed in response to it being determined in step S1801 that the subject tracking frame has entered the zoom-out area ZO, i.e., a zoom-out operation for out-of-frame prevention control. When it is after the out-of-frame prevention control zoom-out operation (YES in step S1802), the processing proceeds to step S1803.

In step S1803, the automatic zooming control unit 122 determines whether the subject tracking frame related to the subject to be tracked is fitted within (fully contained in) the zoom-in area ZI. The zoom-in area ZI here corresponds to the zoom-in area ZI described with reference to FIGS. 4A to 4C. When it is determined in step S1803 that the subject tracking frame (subject) is not fitted within the zoom-in area ZI (NO in step S1803), the automatic zooming control processing ends. On the other hand, when the subject tracking frame is fitted within the zoom-in area ZI (YES in step S1803), that is, when the subject is caught near the screen center and is caught so as to have a subject size within a field angle in a zoom return position, the processing proceeds to step S1805, in which a zoom-in operation is started. The zoom-in operation performed in this step corresponds to a zoom-in operation for out-of-frame prevention control. After the zoom-in operation is performed, the automatic zooming control ends.

For performing both the out-of-frame prevention control and the size holding control in the automatic zooming, the subject is first caught near the screen center through the out-of-frame prevention control, and then, the size holding control is made executable. Thus, in a state in which a zoom-out operation for out-of-frame prevention control has been performed, the automatic zooming processing for keeping the subject size constant (for size holding control) (in steps S1806 to S1814), which will be described later, is not performed. In other words, when the out-of-frame prevention control has been performed, the size holding control is restricted until the zoom-in operation for out-of-frame prevention control is completed.

When it is determined in step S1802 that it is not after the out-of-frame prevention control zoom-out operation (NO in step S1802), the processing proceeds to step S1806. In steps S1806 to S1809, predetermined ratios M and N to be used for determining whether to perform a zoom-in operation/out operation for size holding control that is to be described later are set according to whether the image capturing SW 127 is being half pressed in self photographing (set as M>1, N<1). First, in step S1806, the automatic zooming control unit 122 determines whether the self photographing detection unit 126 detects self photographing. When self photographing is performed (YES in step S1806), the processing proceeds to step S1807. When self photographing is not performed (NO in step S1806), the processing proceeds to step S1810.

In step S1807, the automatic zooming control unit 122 determines whether the image capturing SW 127 is being half pressed. When the image capturing SW 127 is not being half pressed (NO in step S1807), the processing proceeds to step S1809, in which the automatic zooming control unit 122 sets a predetermined value M_EVF as a predetermined ratio M, and sets a predetermined value N_EVF as a predetermined ratio N. In addition, when the image capturing SW 127 is being half pressed (YES in step S1807), the processing proceeds to step S1808, in which the automatic zooming control unit 122 sets a predetermined value M_SW as a predetermined ratio M, and sets a predetermined value N_SW as a predetermined ratio N. Here, the predetermined value M_EVF is assumed to be a value larger than the predetermined value M_SW, and the predetermined value N_EVF is assumed to be a value smaller than the predetermined value N_SW. When the predetermined ratios M and N are set, the processing proceeds to step S1810.

In step S1810, the automatic zooming control unit 122 compares the reference subject size (reference size) set in step S1102, S1110, or S1115, with the size of the subject detected in step S1800. The processing corresponds to the determination as to whether an image satisfies a predetermined composition condition (condition based on the size of the subject in this case). When the size of the subject detected in step S1800 is larger than a predetermined ratio M time of the reference size (YES in step S1810), the processing proceeds to step S1813. In addition, when self photographing is not performed, a predetermined ratio M is set to a predetermined value smaller than the predetermined value M_EVF.

In step S1813, the automatic zooming control unit 122 starts a zoom-out operation. The zoom-out operation performed in this step corresponds to a zoom-out operation for size holding control. After the zoom-out operation is performed, the automatic zooming control ends.

On the other hand, when it is determined in step S1810 that the size of the subject detected in step S1800 is equal to or less than the M time of the reference size (NO in step S1810), the processing proceeds to step S1811. In step S1811, the automatic zooming control unit 122 compares the reference subject size with the size of the subject detected in step S1800. The processing corresponds to the determination as to whether an image satisfies a predetermined composition condition (condition based on the size of the subject in this case). When the size of the detected subject is smaller than a predetermined ratio N time of the reference size (YES in step S1811), the processing proceeds to step S1812. In addition, when self photographing is not performed, a predetermined ratio N is set to a predetermined value larger than the predetermined value N_EVF. On the other hand, when the size of the detected subject is equal to or larger than the N time of the reference size (NO in step S1811), the automatic zooming control ends.

In step S1812, the automatic zooming control unit 122 determines whether the subject tracking frame related to the subject to be tracked is fitted within (fully contained in) the zoom-in area ZI. This is for preventing the subject from going out of a frame due to a zoom-in operation when the subject is located at the peripheral portion of the screen. The zoom-in area ZI here corresponds to the zoom-in area ZI described with reference to FIG. 5E. When it is determined in step S1812 that the subject tracking frame is not fitted within the zoom-in area ZI (NO in step S1812), the automatic zooming control processing ends.

On the other hand, when it is determined in step S1812 that the subject tracking frame is fitted within the zoom-in area ZI (YES in step S1812), the processing proceeds to step S1814. In step S1814, the automatic zooming control unit 122 starts a zoom-in operation. The zoom-in operation performed in this step corresponds to a zoom-in operation for size holding control. In this manner, in the present exemplary embodiment, the zoom-in operation is started after the subject is fitted within the zoom-in area ZI, for preventing the subject from going out of a frame even in the zoom-in operation for size holding control. After the zoom-in operation is performed, the automatic zooming control processing ends.

As described above in steps S1806 to S1809, when self photographing is performed, in a state in which the image capturing SW 127 is not half pressed, predetermined ratios M and N are set so as to make it difficult to perform a zooming operation. In other words, in a state in which the subject is adjusting a composition or a field angle while viewing the display unit 109 (in a state in which the image capturing SW 127 is not half pressed), a condition that restricts a zooming operation is set, as compared with a state in which a composition or a field angle has been determined (in a state in which the image capturing SW 127 is being half pressed). This can efficiently reduce unintentional variation in field angle that occurs after the completion of image capturing preparation, while enabling field angle adjustment that reflects the intension of the photographer.

In self photographing, the photographer may desire a composition unique to the photographer instead of a composition that strictly matches a default composition such as "upper body". Thus, when the photographer intentionally moves the digital camera 100 to adjust the composition, if automatic zooming control is performed so as to strictly match a default composition, the composition adjusted by the photographer may be canceled, and image capturing may fail to be performed with a composition intended by the photographer.

Figure 9:
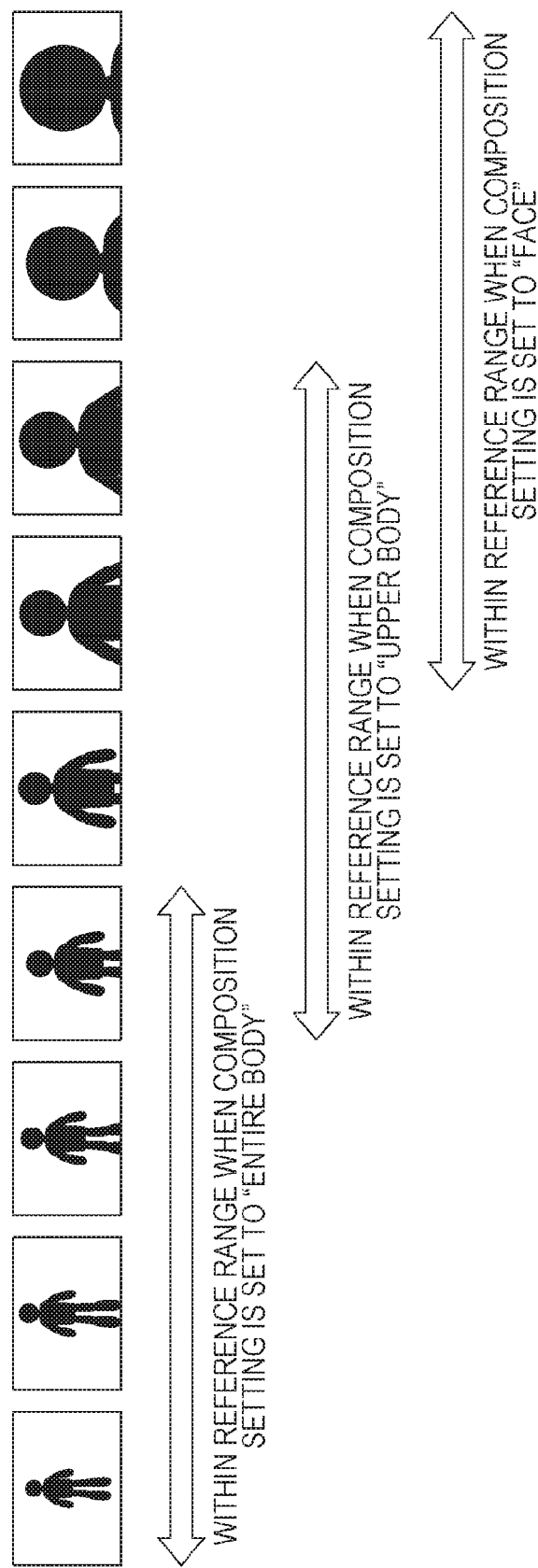
FIG. 9 is a diagram illustrating an example of a size setting of a human figure that falls within a reference range in each of various composition settings.

Thus, in the present exemplary embodiment, as described above, in steps S1806 to S1809, during the image capturing preparation in which the image capturing SW 127 is not half pressed, a threshold value is set so as to make it difficult to perform (so as to suppress) automatic zooming operation. For example, in a state in which the image capturing SW 127 is not half pressed in self photographing, as illustrated in FIG. 9, a reference range in each composition may be set, and a reference size may have a wider range as compared with a state in which the image capturing SW 127 is being half pressed. With this configuration, even in the automatic zooming control that is based on a predefined composition, intentional composition adjustment performed by the photographer can be reflected in self photographing, and image capturing can be performed with a composition desired by the photographer.

Figure 19:
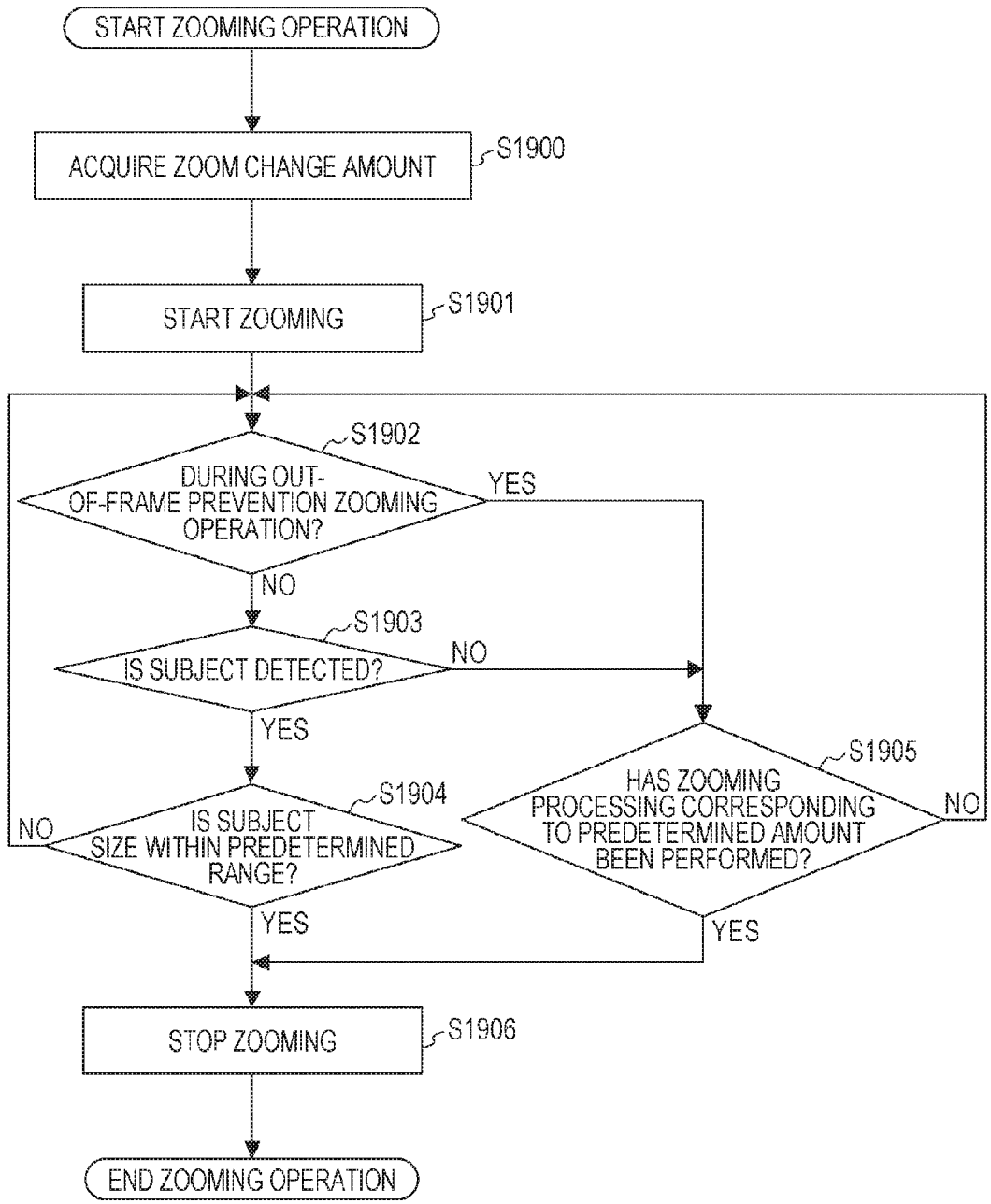
FIG. 19 is a flowchart illustrating a zooming operation.

Next, the zooming operation according to the present exemplary embodiment will be described with reference to FIG. 19. FIG. 19 is a flowchart illustrating a zoom-out operation or a zoom-in operation in step S1804, S1805, S1813, or S1814 in FIG. 18.

First, in step S1900, the automatic zooming control unit 122 acquires a change amount of a zoom magnification (zoom driving amount in the case of optical zooming) from the memory 118. In the case of zoom-out operation for out-of-frame prevention control, a zoom-out amount is set according to detected subject information. Specifically, in the zoom-out operation for out-of-frame prevention (step S1804 in FIG. 18), as the size of the subject becomes smaller, a zoom-out amount is set to be smaller. This can prevent the size of the subject from becoming too small to be detected, due to the zoom-out operation. In addition, in consideration of the minimum detectable subject size, when the size of the subject is smaller than a predetermined size, a zoom-out operation may be avoided. In addition, in a zoom-in operation for out-of-frame prevention, a zoom magnification (may be a zoom position in the case of optical zooming) set before the start of a zoom-out operation is stored in the memory 118, and a zoom-in amount is set so as to have the same zoom magnification as that set before the start of the zoom-out operation.

In addition, in a zoom-out operation for size holding control (step S1813 in FIG. 18), a zoom-out amount (1/M time) corresponding to the predetermined ratio M time used in the determination in step S1810 is set. With this configuration, even when the subject is undetectable, the minimum zoom-out operation required for changing the size of the subject to the reference size can be performed. In the case of a zoom-in operation for size holding control (step S1814 in FIG. 18), similarly, a zoom-in amount (1/N time) corresponding to the predetermined ratio N time used in the determination in step S1811 is set.

In step S1901, the automatic zooming control unit 122 sets the zoom change amount acquired in step S1900, in the CZ control unit 119 or the electronic zooming control unit 120 to instruct the CZ control unit 119 or the electronic zooming control unit 120 to perform zooming processing.

Next, in step S1902, the automatic zooming control unit 122 determines which of the out-of-frame prevention control and the size holding control, the ongoing zooming operation is performed for. When the ongoing zooming operation is a zooming operation for out-of-frame prevention control (step S1804 or S1805 in FIG. 18) (YES in step 31902), the processing proceeds to step S1905. When the ongoing zooming operation is a zooming operation for size holding control (step S1813 or S1814 in FIG. 18) (NO in step S1902), the processing proceeds to step S1903.

In step S1903, the automatic zooming control unit 122 determines whether the subject detection unit 123 detects a subject. When a subject is detected (YES in step S1903), the processing proceeds to step S1904. When no subject is detected (NO in step S1903), the processing proceeds to step S1905.

In step S1904, the automatic zooming control unit 122 compares the reference size with the size of the subject detected in step S1903. As a result of the comparison, the size of the subject detected in step S1903 and the reference size do not fall within a range of a predetermined ratio (within a predetermined change amount) (NO in step S1904), the processing proceeds to step S1902 again, and zooming stop determination is continued. When the ratio falls within the predetermined range through the zooming operation (YES in step S1904), the processing proceeds to step S1906, in which the automatic zooming control unit 122 stops the zooming operation, and the zooming operation processing ends.

On the other hand, when it is determined in step S1902 that the ongoing zooming operation is a zooming operation for out-of-frame prevention control (YES in step S1902) or when no subject is detected during the zooming operation for size holding control (NO in step S1903), the processing proceeds to step S1905. In step S1905, the automatic zooming control unit 122 determines, based on the zoom change amount acquired in step S1900, whether zooming processing corresponding to a zoom change amount that is predetermined according to each zooming operation has been performed. When the zooming processing corresponding to the predetermined zoom change amount has not been performed (NO in step S1905), the processing proceeds to step S1902 again, and the zooming stop determination is continued. When the zooming processing corresponding to the predetermined zoom change amount has been performed (YES in step S1905), the processing proceeds to step S1906, in which the automatic zooming control unit 122 stops the zooming operation, and the zooming operation processing ends.

As described above, in the present exemplary embodiment, the description has been given of an example case of performing automatic zooming control by comparing the reference size with the size of the detected subject. Alternatively, a value other than the sizes that indicates the state of the subject may be used as a comparison criterion. For example, the position and the incline with respect to an optical axis of the subject may be used. This case will be described with reference to FIG. 10.

Specifically, the following case is assumed. In self photographing, the photographer determines a composition in a scene as illustrated in FIG. 10A. When image capturing preparation is completed, the image capturing SW 127 is half pressed. Then, the digital camera inclines due to hand shake as illustrated in FIG. 10B, so that the position and the size of the subject within an image change. In such a case, in the reference size setting in FIG. 11 and the automatic zooming control in FIG. 18, the following processing is performed.

First, when the image capturing SW 127 is half pressed, in step S1102, the automatic zooming control unit 122 stores the position, the size, and the incline of the detected subject as reference feature values (reference values). Then in steps S1806 to S1814, the position, the size, and the incline of the currently-detected subject are compared with stored reference feature values. If there is a change larger than a predetermined change amount, zooming-in/out control is performed. When it is determined that zooming-in/out control is to be performed, the zoom magnification is changed via optical zooming or electronic zooming so as to match the reference feature values. In addition, when the subject inclines as compared with the reference feature values as illustrated in FIG. 10B, a range 1000 is extracted via the electronic zooming, and the extracted range 1000 is set as a captured image.

In this manner, as a condition for determining a composition of an image (composition condition), not only the size of a subject, but also information relating to the position and the incline of the subject may be used. With this configuration, even if the position and the incline of the subject change due to hand shake or the like while the image capturing SW 127 is being half pressed, a captured image can be obtained with a composition desired by the photographer maintained.

In addition, in the present exemplary embodiment, the description has been given of an imaging apparatus that can perform automatic zooming control also in cases other than self photographing. The present invention, however, is applicable to a case in which automatic zooming control is performed only in self photographing.

A preferred exemplary embodiment of the present invention has been described above. The present invention, however, is not limited to the above exemplary embodiments. Various modifications and changes can be made without departing from the scope of the present invention.

In addition, the present invention is not limited to an apparatus that is mainly intended for image capturing, such as a digital camera. The present invention is applicable to any apparatus that contains or externally connects to an imaging apparatus, such as a mobile phone, a personal computer (laptop type, desktop type, tablet type, etc.), and a game apparatus. Thus, a "zooming control device" in this specification is intended to encompass an arbitrary electronic device having a zooming function.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-070195, filed Mar. 30, 2015, which is hereby incorporated by reference herein in its entirety.

What is claimed is:

1. A zooming control device comprising:
a first determination unit configured to determine whether a current state is a specific image capturing state in which a photographer can perform image capturing while viewing an image of a subject including the photographer himself or herself;
an acquisition unit configured to acquire information relating to a subject detected from an image;
a second determination unit configured to determine whether an image satisfies a predetermined composition condition, based on the information relating to the subject that has been acquired by the acquisition unit;
a zooming control unit configured to, in a case in which the second determination unit determines that the image does not satisfy the predetermined composition condition, perform zooming control so as to satisfy the predetermined composition condition; and
a reception unit configured to receive a predetermined operation for instructing an image capturing preparation operation,
wherein the zooming control unit performs the zooming control in a first state in which the predetermined operation is not received by the reception unit, and in a case in which the first determination unit determines that the current state is the specific image capturing state, the zooming control unit continues the zooming control even in a second state in which the predetermined operation is received.

2. The zooming control device according to claim 1, wherein, in a case in which the first determination unit does not determine that the current state is the specific image capturing state, the zooming control unit stops the zooming control in the second state.

3. The zooming control device according to claim 1, wherein, in the zooming control that is performed in a case in which the first determination unit determines that the current state is the specific image capturing state, the respective predetermined composition conditions set in the first state and the second state are different from each other.

4. The zooming control device according to claim 3, wherein, in the zooming control that is performed in a case in which the first determination unit determines that the current state is the specific image capturing state, the predetermined composition condition set in the first state is a condition more difficult to satisfy than the predetermined composition condition set in the second state.

5. The zooming control device according to claim 3, wherein, in the zooming control that is performed in a case in which the first determination unit determines that the current state is the specific image capturing state, the predetermined composition condition is set so as to restrict a change in a zoom magnification in the zooming control performed in the first state, as compared with the zooming control performed in the second state.

6. The zooming control device according to claim 1, wherein, in the zooming control that is performed in a case in which the first determination unit determines that the current state is the specific image capturing state, the second determination unit determines whether an image satisfies the predetermined composition condition in the second state, based on the information relating to the subject that has been acquired when the predetermined operation has been received from the first state.

7. The zooming control device according to claim 1, wherein the information relating to the subject includes information relating to a feature value of at least one of a size, a position, and an incline with respect to an optical axis of the subject, and
wherein the predetermined composition condition is determined based on whether the feature value falls within a predetermined range from a reference value.

8. The zooming control device according to claim 7, wherein, in the zooming control that is performed in a case in which the first determination unit determines that the current state is the specific image capturing state, the predetermined range in the first state is set to be wider than the predetermined range in the second state.

9. The zooming control device according to claim 7, wherein, in the zooming control that is performed in a case in which the first determination unit determines that the current state is the specific image capturing state, in the first state, the reference value is set to a predetermined value according to a predefined type of a composition, and in the second state, the reference value is set based on the feature value that has been acquired when the predetermined operation has been received from the first state.

10. The zooming control device according to claim 1, wherein the zooming control unit changes a zoom magnification via at least either of optical zooming and electronic zooming.

11. The zooming control device according to claim 1, further comprising a control unit configured to perform focus adjustment control and exposure control when the predetermined operation is received,
wherein, in the zooming control that is performed in a case in which the first determination unit determines that the current state is the specific image capturing state, in a case in which a zoom magnification is changed via optical zooming in the second state, the control unit performs focus adjustment control and exposure control again.

12. The zooming control device according to claim 1, wherein the first determination unit determines whether the current state is the specific image capturing state, according to a position of a display unit for displaying an image, or an image capturing mode selected by a photographer.

13. A method for controlling a zooming control device, the method comprising:
a first determination step of determining whether a current state is a specific image capturing state in which a photographer can perform image capturing while viewing an image of a subject including the photographer himself or herself;
an acquisition step of acquiring information relating to a subject detected from an image;
a second determination step of determining whether an image satisfies a predetermined composition condition, based on the information relating to the subject that has been acquired by the acquisition step;
a zooming control step of, in a case in which the second determination step determines that the image does not satisfy the predetermined composition condition, performing zooming control so as to satisfy the predetermined composition condition; and
a reception step of receiving a predetermined operation for instructing an image capturing preparation operation,
wherein, in the zooming control step, the zooming control is performed in a first state in which the predetermined operation is not received by the reception step, and in a case in which the first determination step determines that the current state is the specific image capturing state, the zooming control is continued even in a second state in which the predetermined operation is received.

* * * * *